United States Patent
Matsumoto et al.

(10) Patent No.: US 6,798,872 B1
(45) Date of Patent: Sep. 28, 2004

(54) CALLER INFORMATION DISPLAY SYSTEM AND RECORDING MEDIUM

(75) Inventors: Masaharu Matsumoto, Tachikawa (JP); Shigehiko Yazawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 449 days.

(21) Appl. No.: 09/692,018

(22) Filed: Oct. 19, 2000

(30) Foreign Application Priority Data

Dec. 27, 1999 (JP) .......................................... 11-369240

(51) Int. Cl.$^7$ .......................... H04M 1/56; H04M 15/06
(52) U.S. Cl. ............................ 379/142.01; 379/142.07; 379/142.16; 379/142.17; 379/93.17; 379/93.23
(58) Field of Search ........................ 379/142.01, 142.04, 379/142.06, 142.07, 142.08, 142.14, 142.15, 142.17, 142.16, 93.01, 93.17, 93.21, 93.23; 370/352, 395.52, 260

(56) References Cited

U.S. PATENT DOCUMENTS

| | | | | |
|---|---|---|---|---|
| 5,815,080 A | * | 9/1998 | Taguchi .................... | 379/93.17 |
| 5,907,604 A | * | 5/1999 | Hsu ........................ | 379/142.01 |
| 5,999,208 A | * | 12/1999 | McNerney et al. ...... | 348/14.08 |
| 6,229,883 B1 | * | 5/2001 | Kakizaki et al. ......... | 379/93.23 |
| 6,424,647 B1 | * | 7/2002 | Ng et al. ................... | 370/352 |

FOREIGN PATENT DOCUMENTS

| | | |
|---|---|---|
| JP | 03-158054 | 7/1991 |
| JP | 8-223291 | 8/1996 |
| JP | 9-64983 | 3/1997 |

* cited by examiner

Primary Examiner—Quoc Tran
(74) Attorney, Agent, or Firm—Katten Muchin Zavis Rosenman

(57) ABSTRACT

A caller information display system and recording medium in a communication system in which voice communication and data communication can be done between multiple terminals over a network following an Internet protocol, includes a caller information storage unit in which caller information of each local terminal is stored in advance in each terminal, and an input unit that inputs caller information. A display unit displays caller information, and a call circuit unit controls voice communication. The display system also has a caller information transmission and reception control unit which controls transmission and reception of caller information when a call is made or received. When a call is made or received by voice communication with another terminal, caller information is mutually transferred between the calling terminal and the called terminal, and information on the other caller is displayed on the display unit of both the caller terminal and the call recipient terminal simultaneously with the callout or incoming call display.

8 Claims, 33 Drawing Sheets

SELECT INCOMING-CALL PROCESSING

• RESPONSE
• TRANSMIT FOLLOWING MESSAGE (SELECT ONE)
　<> AM BUSY, WILL CALL BACK
　<> PLEASE CONTACT BY E-MAIL
　<> SORRY, PLEASE CALL AGAIN LATER
　　 (IN XX MINUTES)

‥

CALLER INFORMATION DISPLAY SYSTEM AND RECORDING MEDIUM

BACKGROUND OF THE INVENTION

1. Field of the Invention

This invention relates a caller information display system and recording medium in a communication system that allows voice and data communication to be done simultaneously between multiple communication terminals.

2. Description of the Prior Art

The popularization of the Internet and intranets in recent years has brought with it a growing desire to unify voice information with IP (Internet protocol) information and carry on voice communication (telephone calls) via IP networks. The appearance of VoIP (Voice over IP) technology in response to this need has made it possible to conduct telephone calls via a LAN (Local Area Network) or the Internet using personal computers (PCs) as terminals. VoIP technology converts voice information into IP packets and makes it possible to conduct a telephone conversation over an IP network; IP address information can be obtained from the telephone number or other identifying information of the other party to the communication from a server known as a gatekeeper, and after going through a communication setup procedure with the other terminal, voice data can be transmitted and received directly by the other terminal, and one can conduct voice communication.

Because the voice information is converted into IP packets by VoIP technology, the conversation does not monopolize the communication circuit at all times, and as long as communication circuit bands are empty even during one voice communication, other calls can be received or made. For example, the communication speed when one carries out WWW access or other IP packet communication using a telephone circuit depends on the communication speed of the modem one uses. At present, one can communicate at a speed of up to 56 kbps per telephone circuit. In contrast to this, the band used in one VoIP call can be kept to about 10–20 kbps, thus allowing 2–4 calls to be made per telephone line. And there is a greater need than ever, when a telephone call comes in, to identify the other caller by having the telephone number or the caller's name and other caller information displayed on the receiving terminal before one responds to the incoming call, and various methods have been proposed.

FIG. 32 shows the composition of the previously known example 1, and FIG. 33 shows the composition of the previously known example 2.

FIG. 32 shows an example of a previous system in which a database that collects and stores images or other such information on callers is provided, and displaying is done on a computer associated with each telephone set; this is disclosed, for example, in unexamined patent application H11-88496 [1999]. In FIG. 32, 80 is a subscriber line exchange, 81 is a caller number receiver, 82 is a caller information storage database provided for collecting and managing with respect to many telephone sets, 83 are telephone sets provided in large numbers, and 84 are PCs (personal computers) provided in correspondence with the telephone sets 83. In this example 1, when a call comes to a telephone set 83 of subscriber line exchange 80, and when the telephone number of the sending subscriber that is sent to subscriber line exchange 80 when the call arrives is received by caller number receiver 81, the number is displayed on the display unit (not shown in the figure) and is sent to caller information storage database 82. At the caller information storage database 82, the data lookup unit searches the database using the sending subscriber's telephone number and transfers the looked-up data (an image or data concerning the sending subscriber) through the communication control unit to PC 84, which corresponds to telephone set 83 where the incoming call occurred, and displays it on the display unit of PC 84. Caller information storage database 82, by specifying the name of the other party even if a call originates from one telephone set 83, can be used, even if dialing is automated, by looking up the corresponding telephone number. At this time, the various information concerning the looked-up other party (including image data) can be displayed on the display unit of PC 84, which corresponds to the telephone set 83 where the call originated.

FIG. 33 shows another previous system in which a database for caller information is built into a communication terminal that has telephone functions; this is described in, for example, unexamined patent application H6-121302 [1994]. In the diagram, 85 is a communication network having telephone exchange functions, 86 is a communication terminal having telephone functions, and 87 is a handset including a transmitter and receiver. Provided inside communication terminal 86 are a communication control unit 860, a call circuit unit 861, a caller number lookup unit 862, a caller information database 863, a display unit 864 for displaying caller information, and an input unit 865 for storing caller information.

In the case of the previous example 2 of the communication system as well, when a call comes in to communication terminal 86, the caller information database 863 is searched using the caller number that is included in the incoming call information, previously stored information including an image of the caller is displayed on display unit 864, and knowledge concerning the caller is provided before one responds. Also, by the composition of the previous communication system shown in FIG. 33, when a call is made from the communication terminal 86, a still image previously stored in caller information database 863 or a moving picture of the caller can be transmitted to the call recipient in real time by using a camera as input unit 865.

Also, VoIP (Voice over IP) technology has appeared, in which voice information such as the above is telephoned by a LAN (local area network), intranet, Internet, etc. with a personal computer (PC) as the terminal, making it possible to convert voice information into IP (the IP of TCP/IP: Internet protocol) packets and make a call over an IP network.

Specifications covering IP telephony by VoIP have been put forth by ITU-T (International Telecommunications Union, electrical communication standardization division) as H.323 (standards for audio and video communication on non-guarantee networks). These standard specifications cover encoding technology for converting analog audio to digital, packetization technology for putting encoded audio data into IP packets, and "call setup processing" technology for checking the other party's telephone number sent by a telephone set and determining the optimum route. In call setup processing, it is possible to obtain IP address information from the telephone number and other identifying information of the other party to the communication, go through a communication setup procedure with the other terminal, then transmit and receive voice data with the directly connected other terminal and carry on voice communication. The ITU-T has also recommended H.245 (control message protocol standards) and H.450 (standards for added services such as hold and transfer).

Problems which are Solved by the Present Invention

There are cases in which, although it is possible to convey caller information to the call recipient, one would want to have information about the caller without considering conveying information about the call recipient to the caller, for example if a call arrives at another call recipient by transfer or other means at the call recipient, but effecting this is difficult with the previous technology.

And if the caller information is to be updated, with the technology of the above-described previous example 2 the caller information is in each terminal, and each terminal operator must update the information, which has been quite troublesome. If one neglects to do the updating, the latest information is not displayed, so one is required to do updating work frequently.

Moreover, with the technology of the above-described previous example 1, because the database is centrally managed with respect to multiple terminals, when a call arrives, after the caller number is received by the exchange, the database is searched, after the information is found it is transferred to the terminal that receives the call, and the information is displayed on the terminal; the problem has been that it takes time from when a call comes in until the information is displayed.

With previous telephone technology, because one is unable, when making a telephone call, to convey to the other party any indication to answer immediately because it is an urgent matter, there has been a desire to convey to the call recipient a per-call message for the urgency, etc. of the telephone call. If the call recipient is busy when a telephone call arrives and cannot answer the telephone, there has been a need to respond to the telephone call in order to convey to the caller that, for example, one will call back later, and because one's work gets interrupted, there has been a desire to transmit a message to the caller by a simple operation after confirming the identity of the caller when a call comes in.

If one wants to share caller information among many people because it is used in an application such as a common telephone directory, there has been the problem that registering and updating caller information entails a great deal of work. The service of responding to a call that comes in during the midst of a telephone conversation is offered as a call interrupt service of the public telephone network or as a PBX function, but it has been impossible to display caller information and verify the other party when a telephone call arrives in the midst of an ongoing telephone conversation, nor has it been possible to decide whether to switch over the call depending on who the other party is.

SUMMARY OF THE INVENTION

It is an object of the present invention is to solve the above problems, make it easy to register and update caller information, make it possible to simultaneously display caller and call recipient information, shorten the time from the operation of making a call until the information is displayed, allow a message concerning the telephone call to be conveyed from the caller, transmit a message from the call recipient to the caller when a call comes in, automatically register in a common database the latest information that is received, and provide a caller information display device that can reduce the trouble of updating the common database information, as well as to provide a call initiator information display device that displays caller information even in the midst of a telephone conversation and allows one to switch the call as necessary. It is another object of the present invention to provide a caller information display system and recording medium that realize the aforesaid functions.

The present invention makes it possible to pass information and display it on terminals by using VoIP technology for simultaneously transmitting voice/data to the same other party, holding/managing terminal operator information within the sending/receiving terminal, and transmitting/exchanging caller information held in each in a call setup procedure when a telephone conversation begins.

Using the multiple-call control functions of VoIP technology, the present invention makes it possible to display caller information on the receiving terminal and accept an incoming call, even when a new call comes in while the terminal is in the midst of a call.

Figures 25A, 25B:
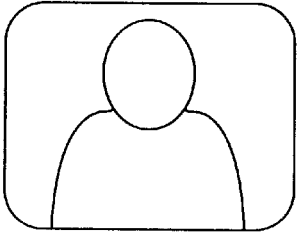
Figure 26:
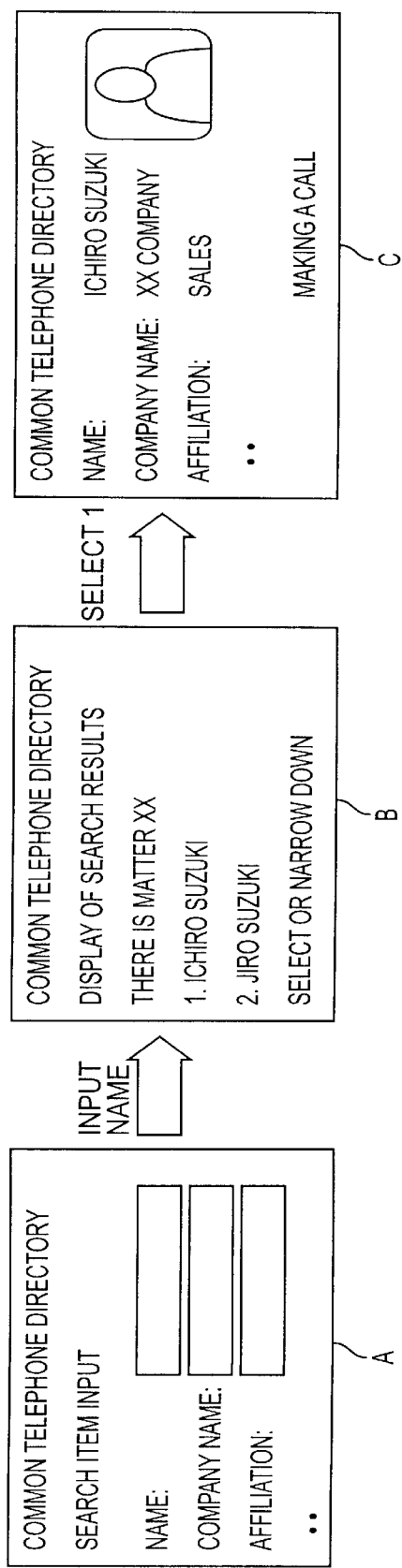
Figure 27:
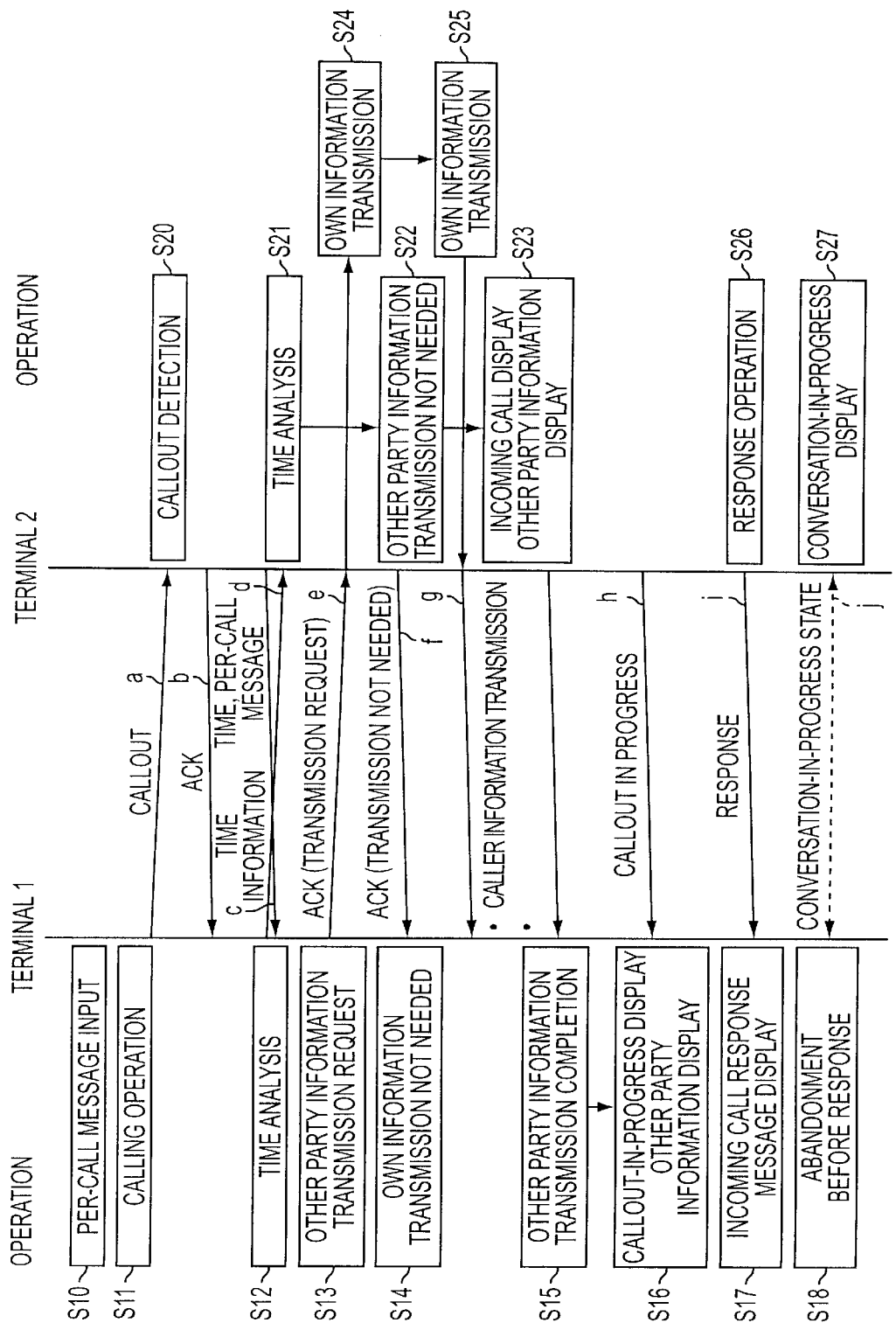
Figure 28:
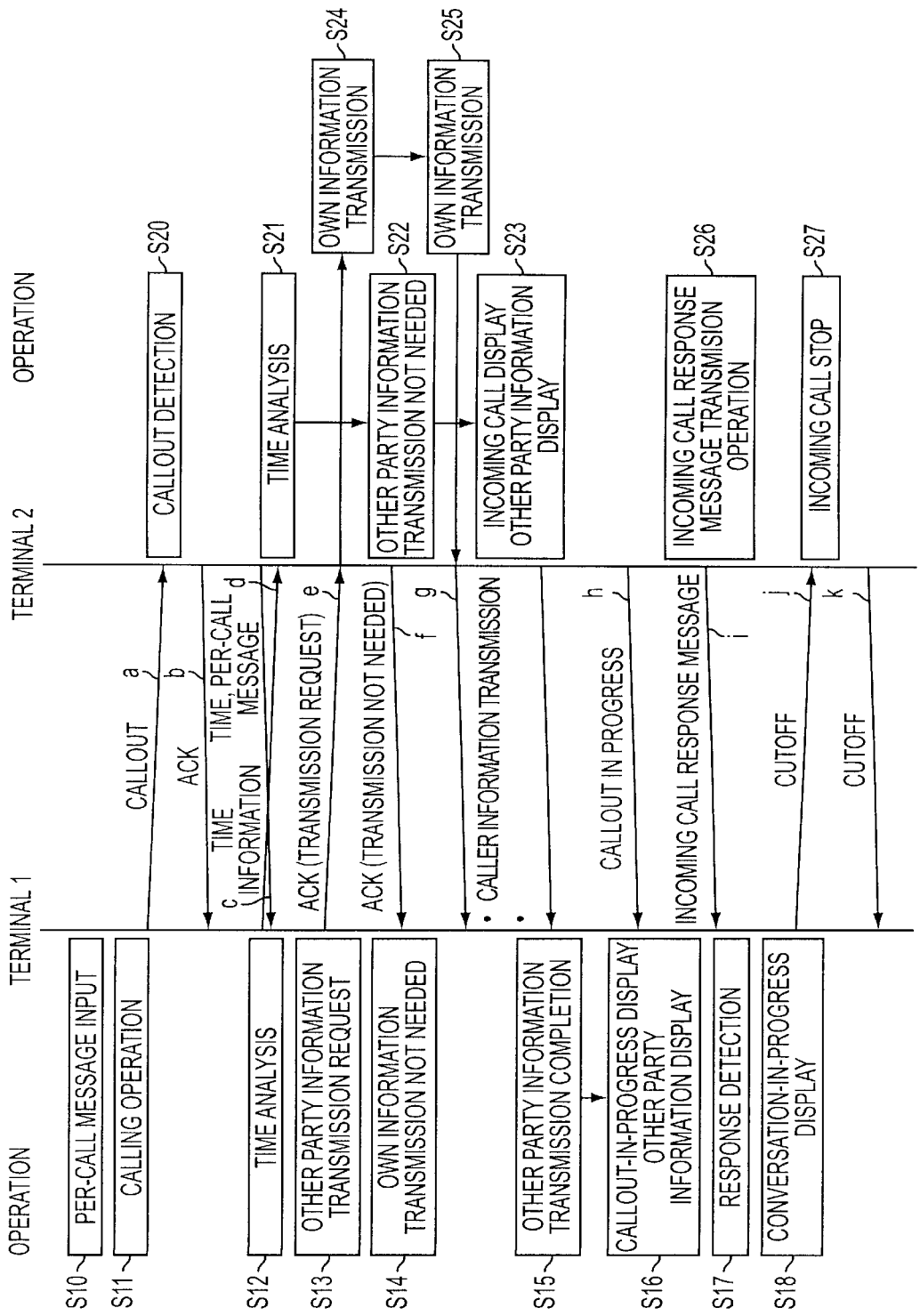
Figure 29:
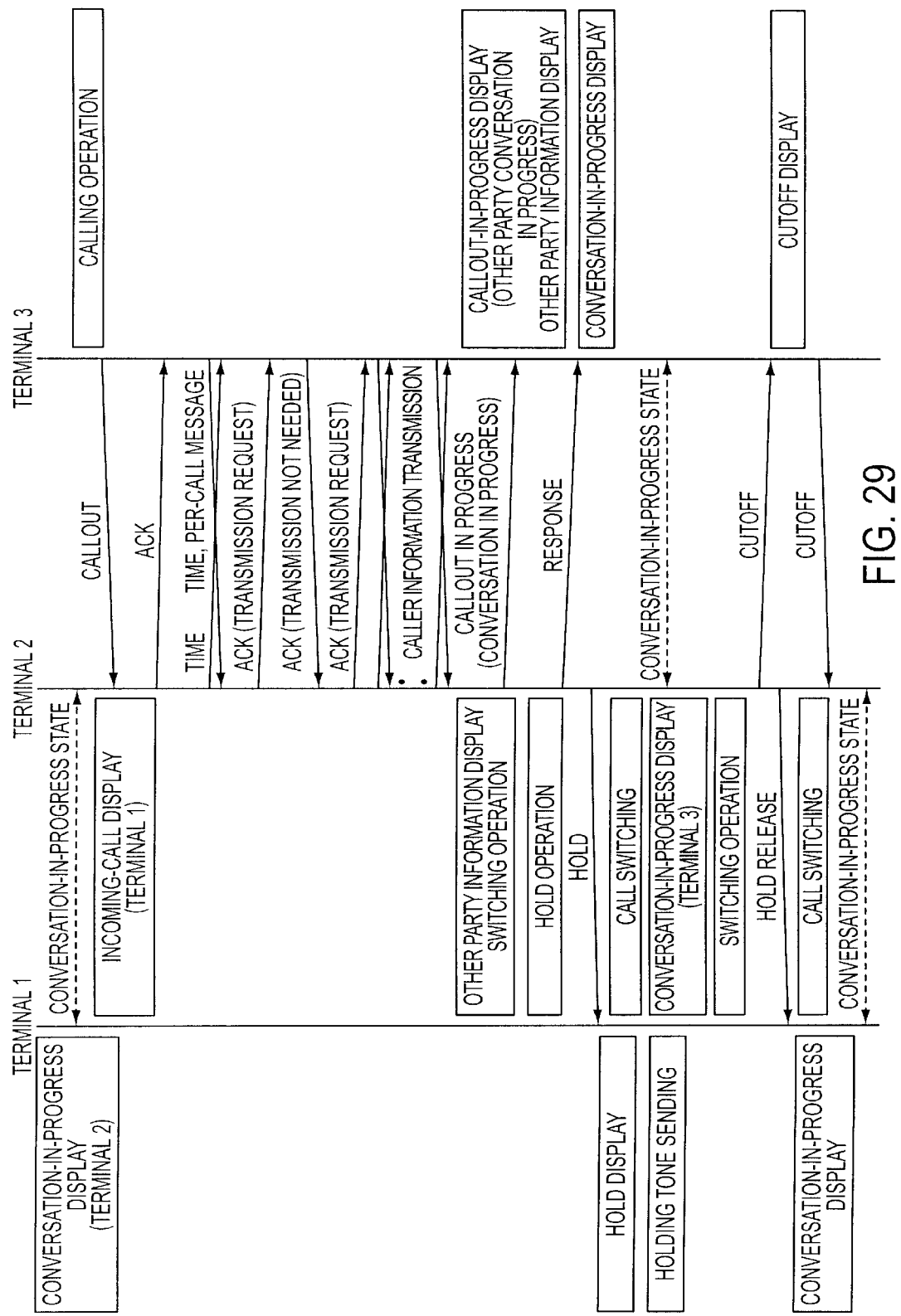
Figure 30:
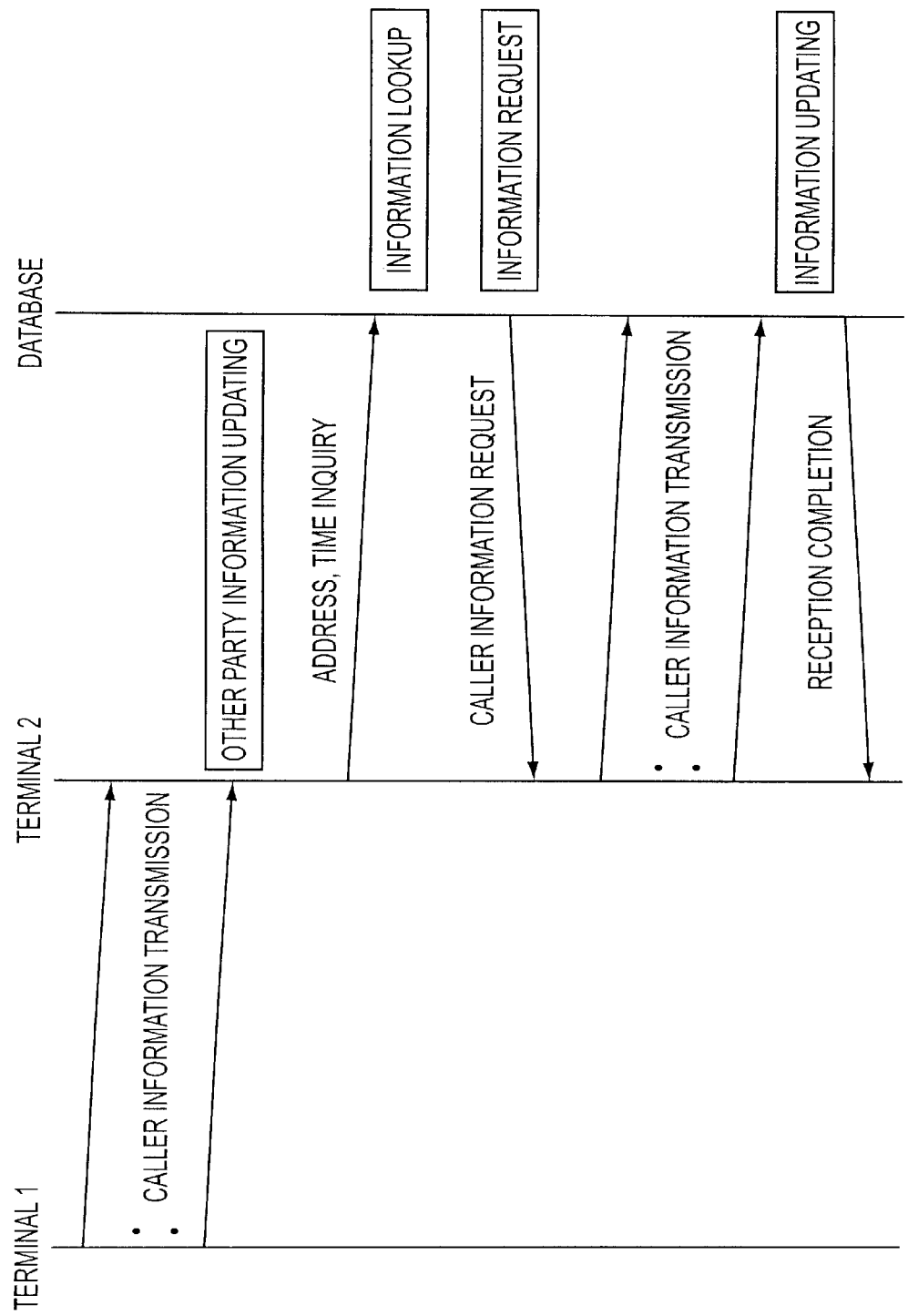

FIGS. 25A and 25B diagrammatically show a display example of caller information and an embodiment of an input screen for incoming call response messages respectively;

FIG. 26 is a diagram showing an embodiment of a display of a terminal at the time of common telephone directory database operation;

FIG. 27 is a diagram showing an operation sequence from making a call until the midst of a conversation, according to the present invention;

FIG. 28 is a diagram showing an operation sequence between terminals from making a call until the abandonment midway due to the transmission and reception of response messages;

FIG. 29 is a diagram showing an operation sequence if an incoming call from a third terminal occurs in the midst of a two-person conversation;

FIG. 30 is a diagram showing an operation sequence for updating a database in which caller information is stored.

Figure 31:
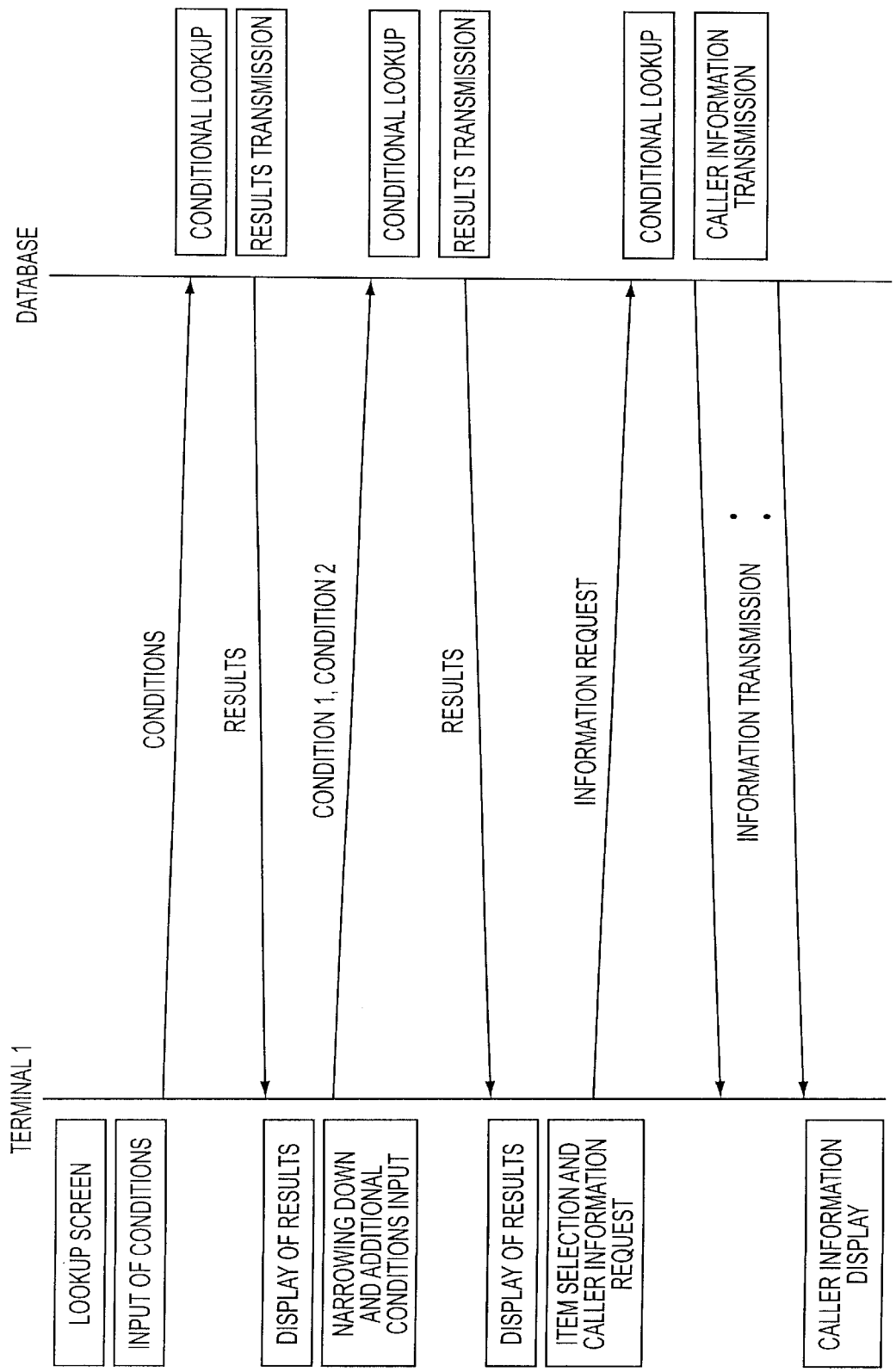
Figure 32:
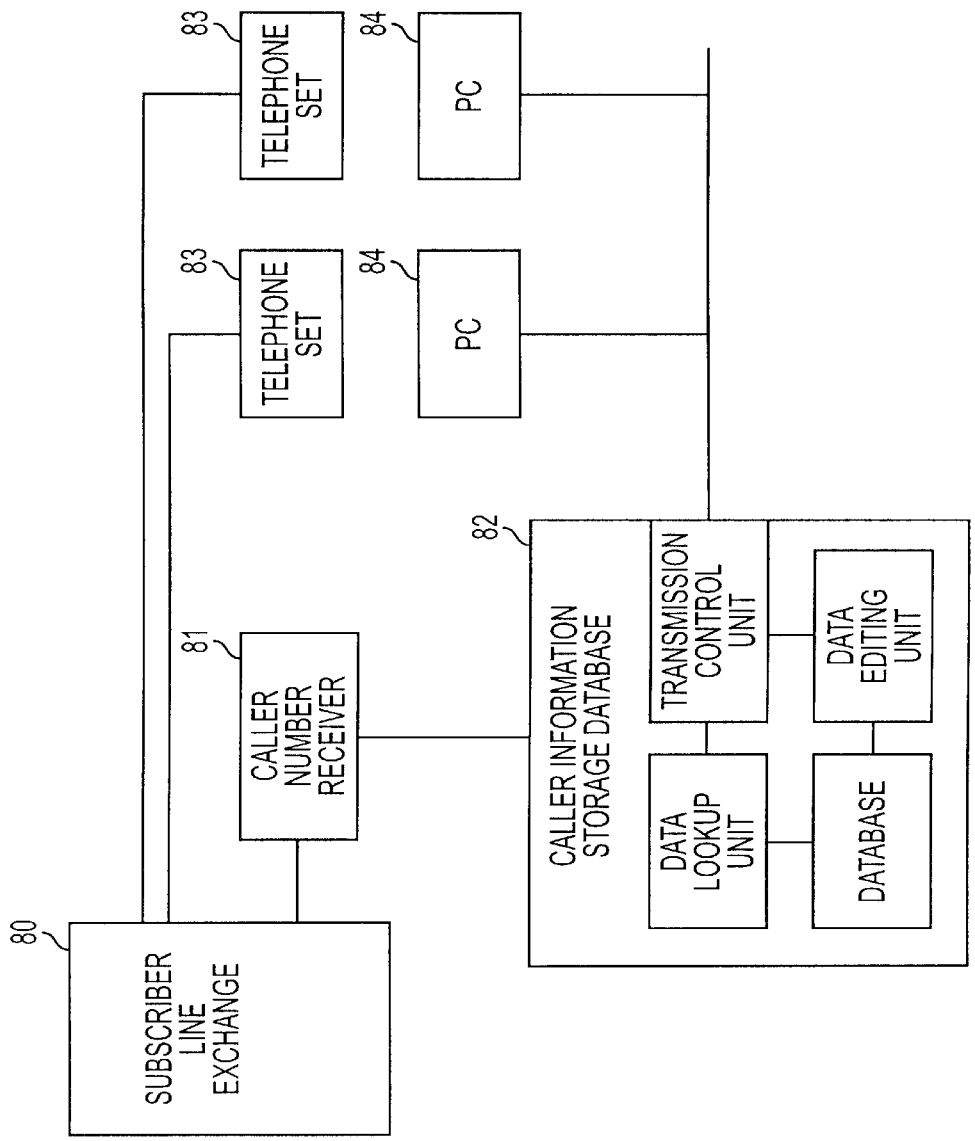
Figure 33:
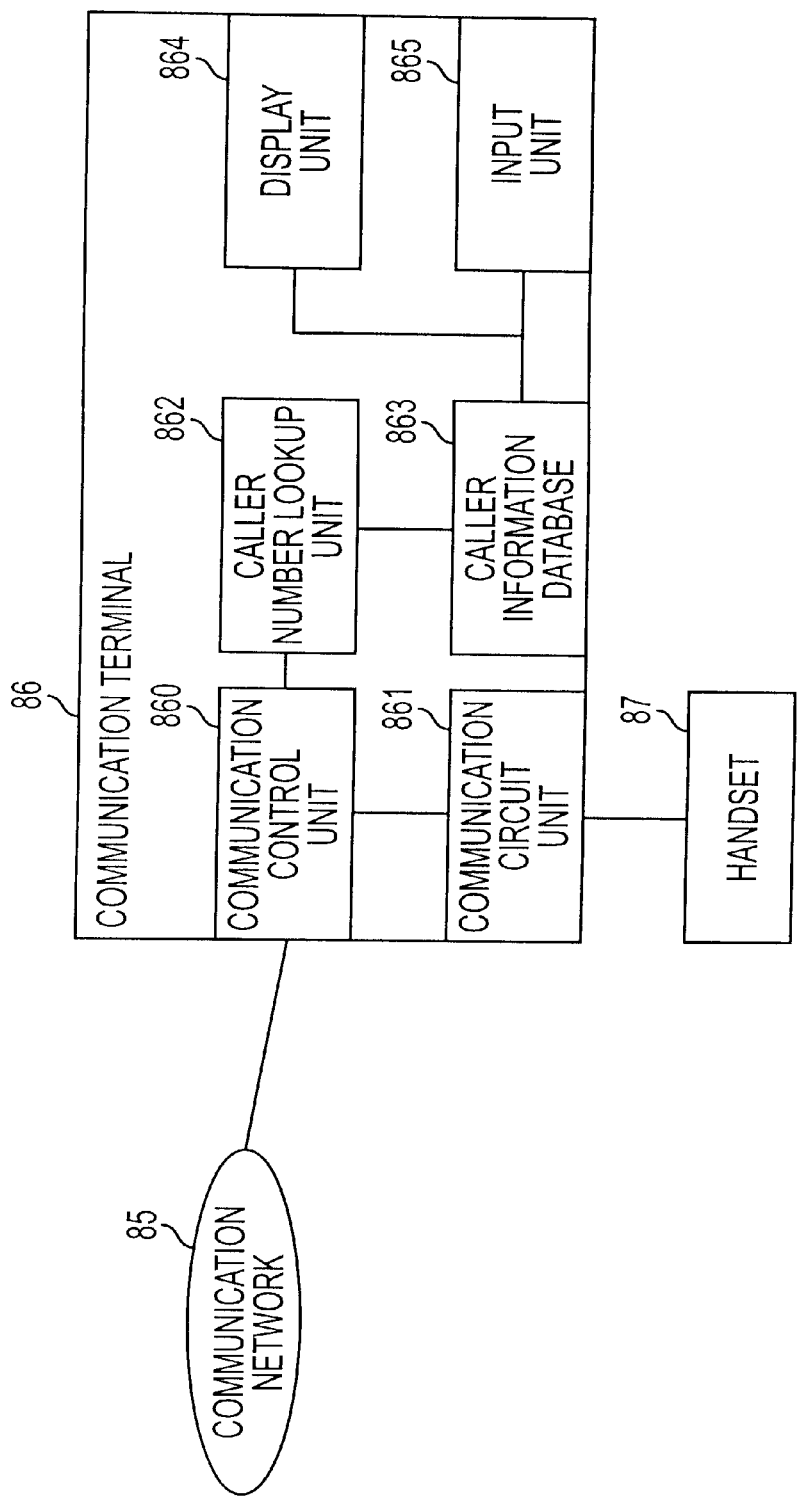

FIG. 31 is a diagram showing an operation sequence between a communication terminal and a database at the time of a caller information inquiry;

FIG. 32 is a diagram showing the composition of a previously known embodiment 1; and FIG. 33 is a diagram showing the composition of a previously known embodiment 2.

DETAILED DESCRIPTION OF THE PREFERRED EMBODIMENTS

Figure 1:
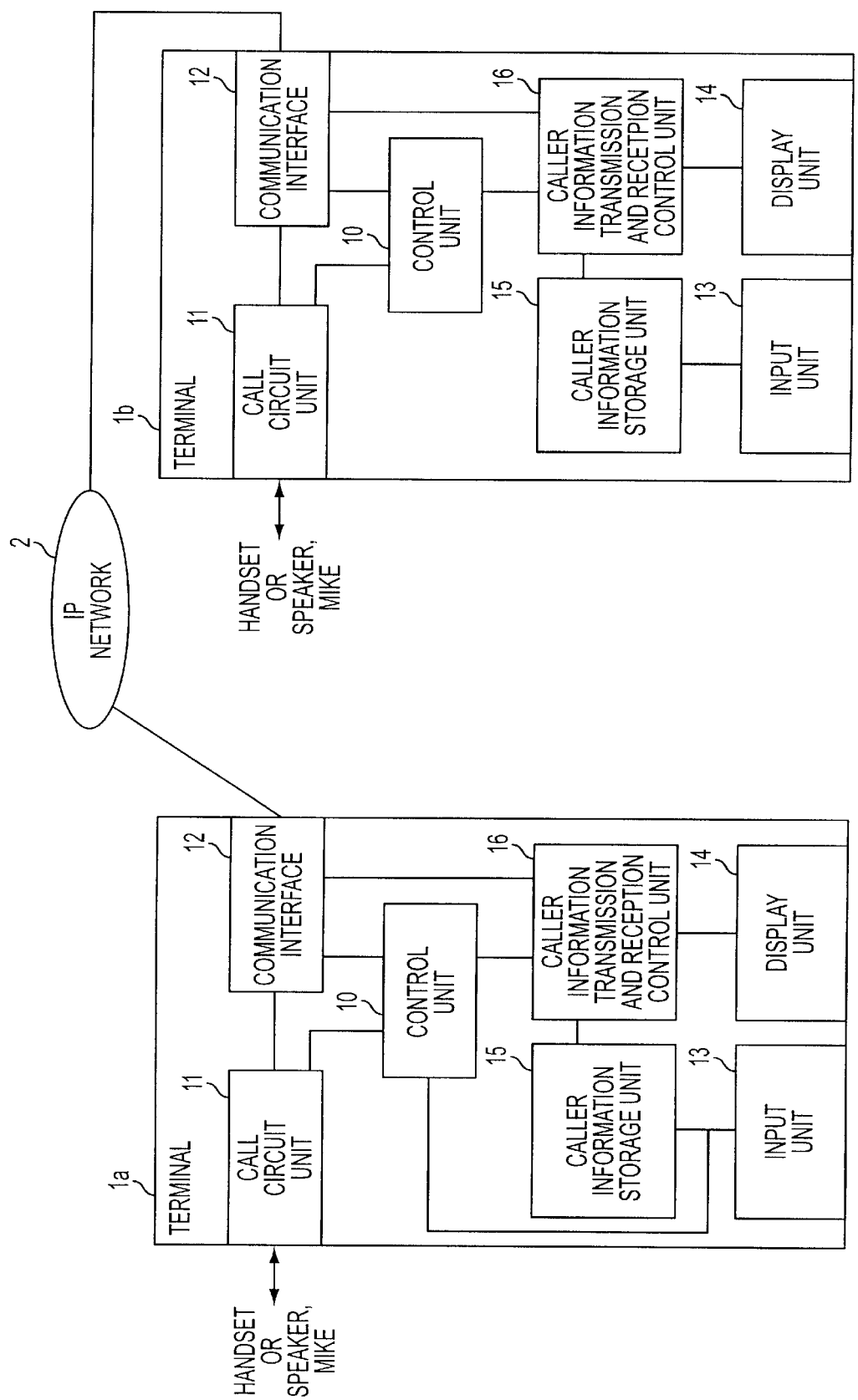
FIG. 1 is a diagram showing a first fundamental composition of the communication system of the present invention.

FIG. 1 is a diagram showing the first fundamental composition of this invention. In the diagram, 1a, 1b are terminals (or communication terminals) having telephony functions; within each terminal 1a, 1b is provided a control unit 10 that includes a CPU and has information processing functions by programs; 11 is a call circuit unit that is connected with a handset, speaker, microphone, etc. and has transmission and reception control functions including voice (digital) packetization/depacketization functions together with conversion back and forth between analog and digital by a codec (coder-decoder); 12 is a communication interface that performs transmission and reception with an IP network 2, which is described below; 13 is an input unit; 14 is a display unit that displays caller information, etc.; 15 is a caller information storage unit that stores the caller information of the local terminal; and 16 is a caller information transmission and reception control unit that transmits and receives caller information via communication interface 12.

Network 2 may be a LAN, intranet, Internet, or other IP network that performs data communication using IP addresses and also performs telephone conversations by VoIP (a network that carries out call control of the network layer by an Internet protocol).

FIG. 1 shows the functional blocks for realizing a caller information display according to this invention, using VoIP technology and explains an outline of its operation in which terminal 1a is on the calling side and terminal 1b is on the called side. The users of terminals 1a, 1b each stores his own name and other information into his caller information storage unit 15 from his respective input unit 13, and when the user of terminal 1 a designates the other party and makes a call, a callout message is transmitted from communication interface 12 to IP network 2 under the control of control unit 10. When this is received by the other terminal 1b, a message indicating reception is sent to the calling side, the callout of the user of terminal 1b is made, and caller information of caller information storage unit 15 is sent to the calling side. When the reception message is received by calling terminal 1a, control unit 10 causes its own caller information stored in caller information storage unit 15 to be transmitted, and when the caller information from the other party is received, displays its caller information on display unit 14 as well as the fact that the other terminal 1b is in callout state. When the user sees on other terminal 1b the user information of calling terminal 1a and responds, his response message is sent to calling terminal 1a, and a voice conversation by VoIP packets begins via call circuit unit 11 and communication interface 12.

In the first fundamental composition of the communication system of the present invention shown in FIG. 1, terminals 1a, 1b have programs and data for performing said control in the memory in control unit 10, and the detailed flow of the program shows the composition of the working example discussed below. The memory that includes such programs may consist not just of RAM that can be accessed directly by the CPU, but various computer-readable recording media such as hard disk, ROM, flexible disk, or CD-ROM, and may be constituted as recording media built into a device that can be accessed via communication means. Likewise with regard to the terminals corresponding to each composition shown in FIGS. 2–7 discussed below, the programs and data for performing each type of control can be stored in the memory in control unit 10, and each can be constituted as a recording medium. The processing flow of such programs shows the composition of the working examples described below.

By the communication system that includes terminals of the first fundamental composition, one's own caller information displayed on the terminal of the other communicant is stored in the local terminal and therefore the information can be updated from input unit 13 of the local terminal, and because during the communication establishment procedure not only is caller information on the caller transferred to the called side but also caller information on the call recipient is transferred to the calling side, the latest information on the other party can be displayed to both caller and call recipient on their terminals at the time of incoming call/callout display.

Figure 2:
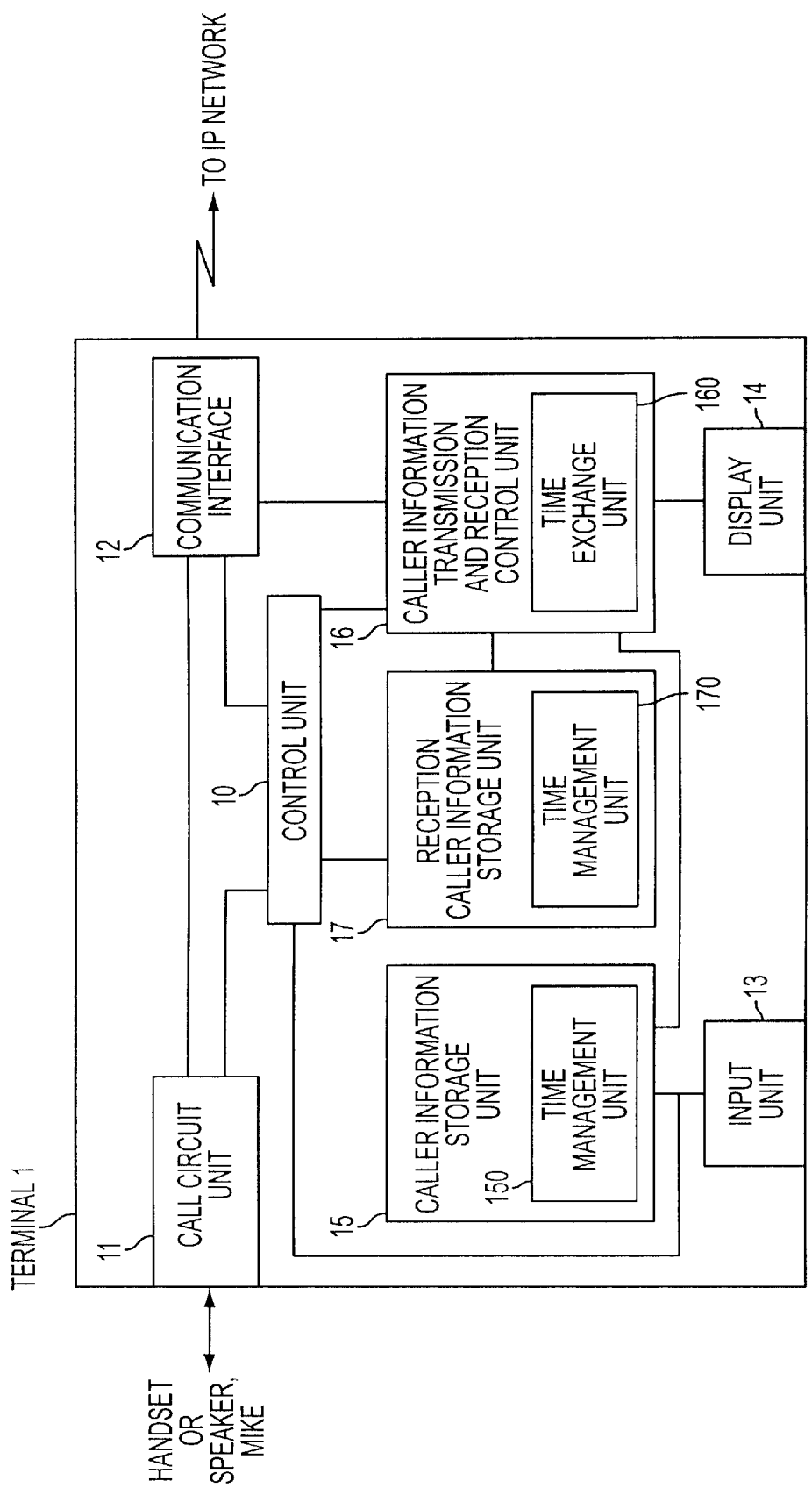
FIG. 2 is a diagram showing a terminal of a second fundamental composition of the communication system of the present invention.

FIG. 2 is a diagram showing a terminal of the second fundamental composition of the communication system of this invention. In the diagram, 1 represents a terminal and corresponds to 1a, 1b in FIG. 1. Symbols 10–16 in terminal 1 denote the parts bearing the same symbols as in FIG. 1. and an explanation of them is omitted. What is different from FIG. 1 is that a reception caller information storage unit, indicated by 17, is provided that stores caller information received from the other terminal; provided within a caller information storage unit 15, which stores information on the caller of the local terminal, is time management unit 150, which indicates the update time (date and time of day) of the caller information; provided within reception caller information storage unit 17 is a time management unit 170, which stores the update date and time of day of the caller information received from the other terminal; and provided within caller information transmission and reception control unit 16 is a time exchange unit 160, which transmits and receives to and from the other communicant the time (update time) date and time of day of the caller information.

In FIG. 2, it is assumed that previously communicated caller information from the other terminal is stored in reception caller information storage unit 17, and when the user of each terminal 1 updates (or initially registers) caller information from input unit 13 of the local terminal, if the update time is also input, it is stored in time management unit 150. And when a call comes in to another terminal, upon receiving the callout message, the other terminal transmits to the calling side the update time of time management unit 150, and upon receiving this the calling terminal compares it with the update time it previously received concerning the other terminal that is stored in time management unit 170 in reception caller information storage unit 17, and if the update time it received this time is newer than the stored update time, causes a message to be transmitted to caller information transmission and reception control unit 16 requesting caller information from the other terminal, with no need to again receive caller information if it is the same as the previously received update time, and control is carried out to display the previously received caller information. If caller information on the other terminal has not previously been received, a request for caller information is made. When the comparison of the update time of the called terminal is made by the calling terminal, in the called terminal as well, upon receiving the update time from the calling terminal, by making a comparison with the update time previously received in time management unit 170 of reception caller information storage unit 17, if it is the same, the previously received caller information stored in reception caller information storage unit 17 is displayed, and if the received update time is newer, control is carried out to request the new caller information from the calling terminal.

In this way, at the time of communication setup, first, only the time information (update date and time of day) of the caller information is exchanged between the calling and called terminals, and a request for transmission of the caller information is made only if the caller information of the other party has not been stored in the local terminal at all or is older than the time information that is stored there; this makes it possible to reduce the volume of communication between the calling and called terminals and to shorten the time needed for passing information between them.

Figure 3:
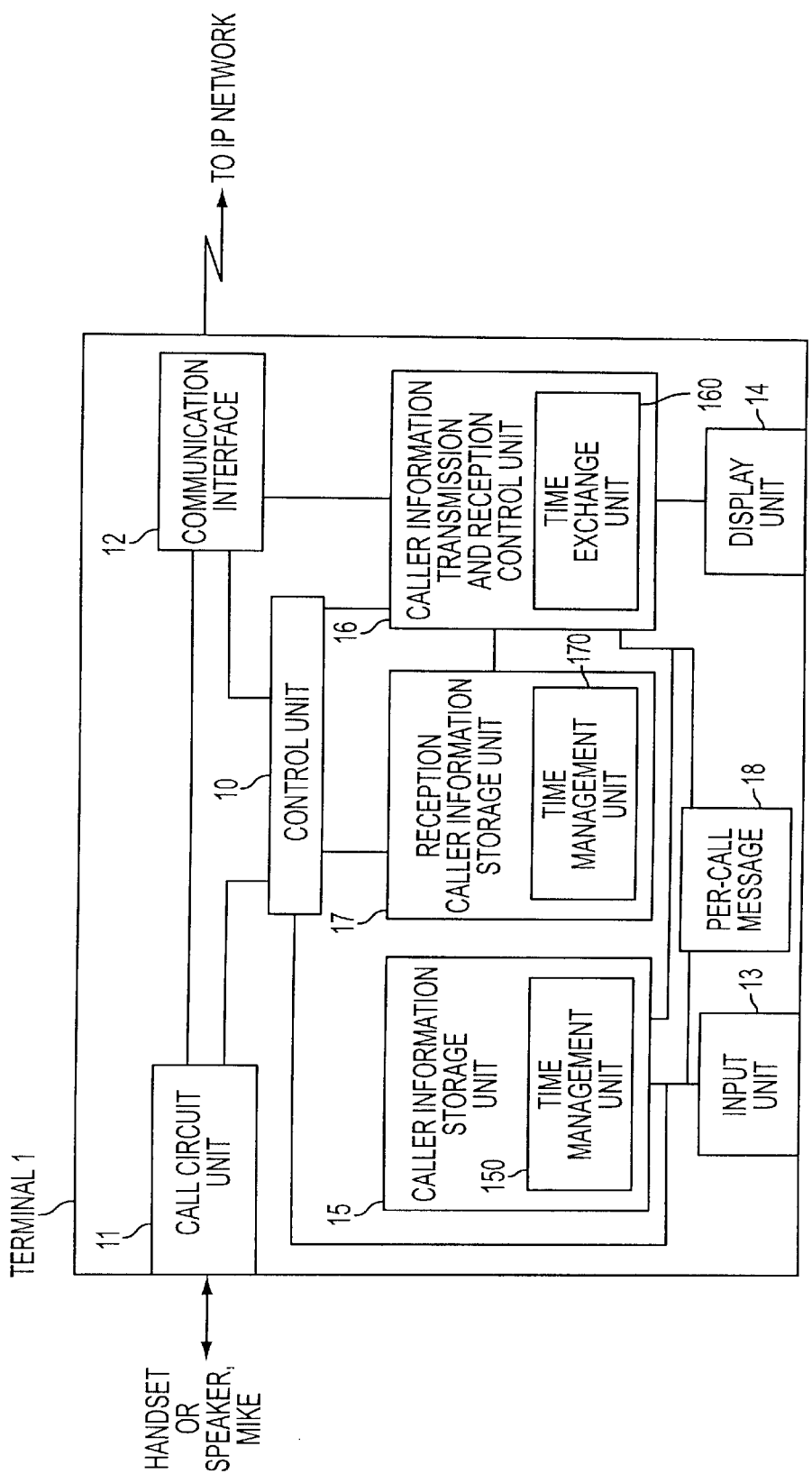
FIG. 3 is a diagram showing a terminal of the communication of the communication system of the present invention.

FIG. 3 is a diagram showing a terminal of the third fundamental composition of the communication system of this invention; in the diagram, symbols 1 and 10–17 denote the parts bearing the same symbols as in FIG. 2 above, and an explanation of them is omitted. What is different from FIG. 2 is that a per-call message storage unit, denoted by 18, is provided; this is a means for storing a per-call message to be transmitted to the other party every time a call is made, before the other party responds.

In FIG. 3, if the caller who originates the call inputs from input unit 13 a per-call message for conveying the degree of urgency or the subject matter when the operation of making the call is made, it is stored in per-call message storage unit 18. The message stored in per-call message storage unit 18 is transferred to the other terminal in the communication setup procedure. At the other terminal that receives the per-call message, the received per-call message is displayed on display unit 14 together with the caller information.

In this way, one can give notice of the degree of urgency of the call, or its nature, from the calling terminal to the call recipient before he answers the telephone.

Figure 4:
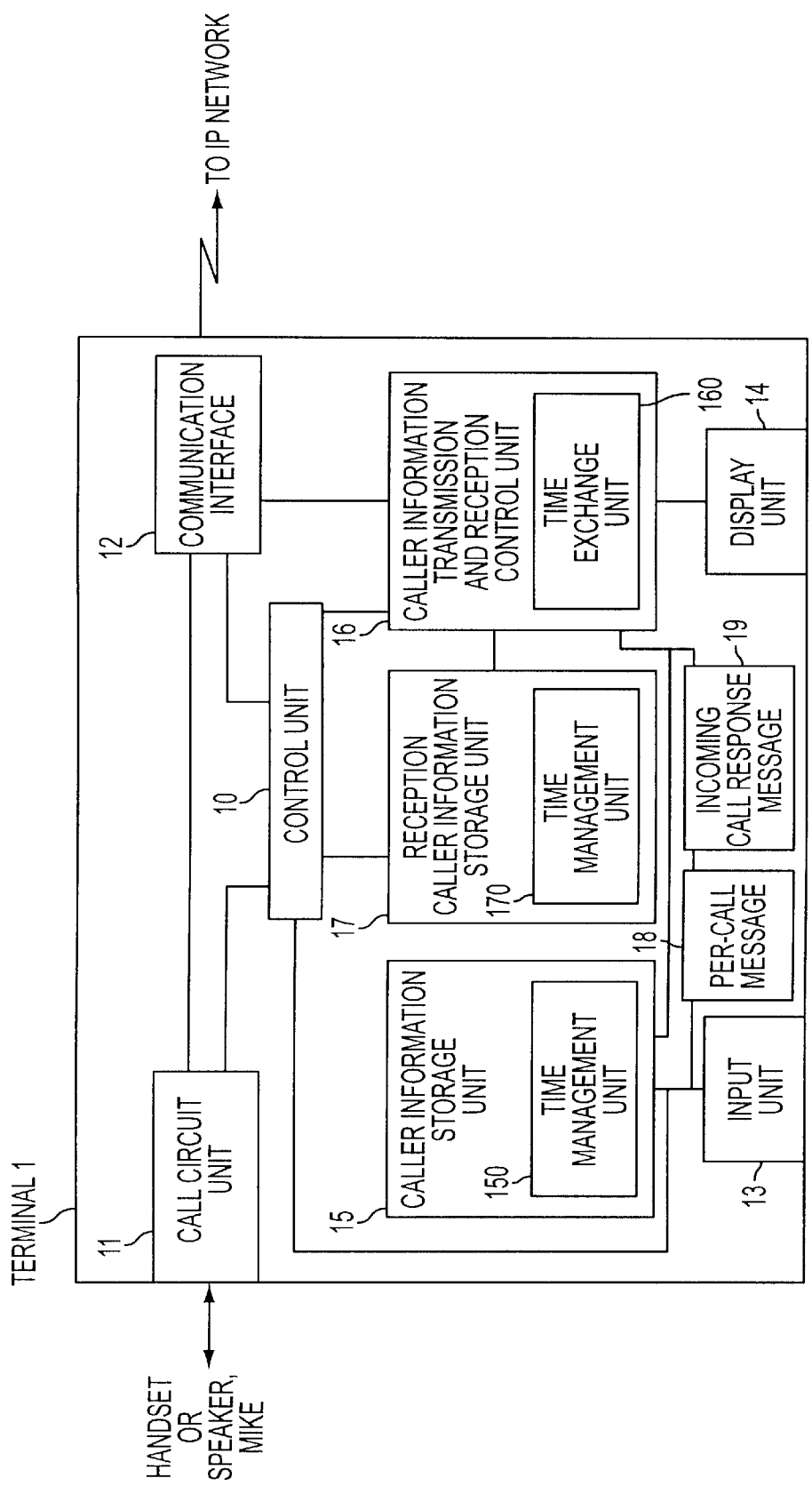
FIG. 4 is a diagram showing a terminal of a fourth fundamental composition of the communication system of the present invention.

FIG. 4 is a diagram showing a terminal of the fourth fundamental composition of the communication system of this invention; in the diagram, symbols 1 and 10–18 denote the same parts as those bearing the same symbols in FIG. 3 above, and an explanation of them is omitted. What is different from FIG. 3 is that an incoming call response message storage unit, denoted by 19, is provided.

In preparation for circumstances in which it is impossible to respond immediately when a call comes in, one stores in incoming call response message storage unit 19 of FIG. 4 messages expressing multiple reasons such as "I'm busy right now", and when a call arrives the user, by operating input unit 13, displays these messages on a menu or buttons, and when a selection is made from among them, the message is transmitted to the calling terminal as an incoming call response message and is displayed on display unit 14 of the calling terminal.

In this way, when one is unable to immediately respond and talk when a call arrives, it is possible by a simple operation to give the caller a reason (the circumstances).

Figure 5:
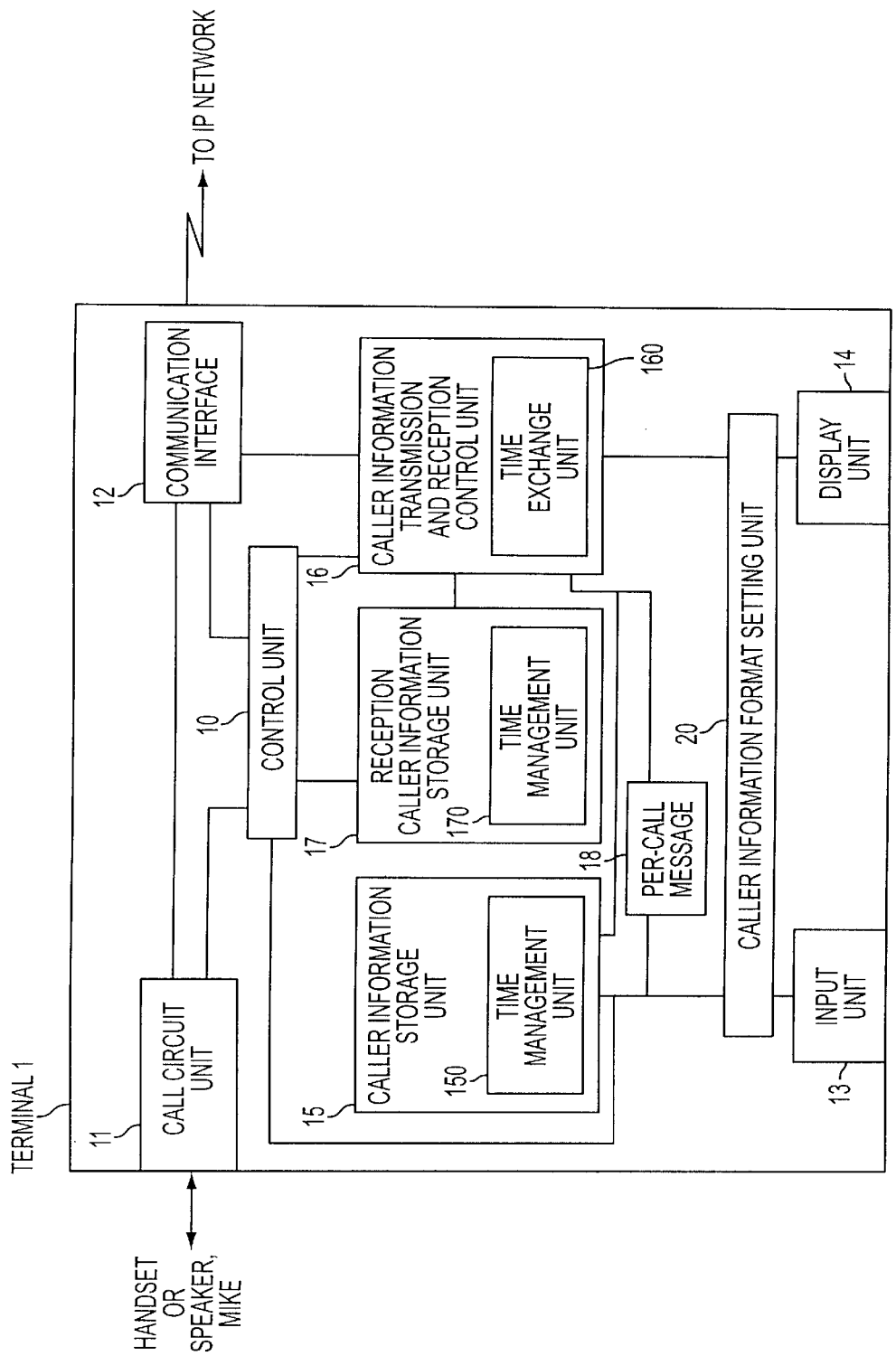
FIG. 5 is a diagram showing a terminal of a fifth fundamental composition of the communication system of the present invention.

FIG. 5 is a diagram showing a terminal of the fifth fundamental composition of the communication system of this invention; in the diagram, symbols 1 and 10–18 denote the same parts as those bearing the same symbols in FIG. 3 above, and an explanation of them is omitted. What is different from FIG. 3 is that a caller information format setting unit, denoted by 20, is provided. This sets the format when caller information is input and when it is displayed.

In FIG. 5, when the terminal user inputs caller information and when he inputs various caller information such as name and affiliation, each item of information is stored in caller information storage unit 15 according to the format set in caller information format setting unit 20, and the format is made uniform between terminals. And if caller information is to be transmitted when a call is made or received, only identifiers denoting the items and information denoting their content are transmitted, according to the format.

In this way, the amount of information when caller information is transferred can be reduced, reducing the information transfer time and shortening the time from when a call operation is made until the information is displayed.

Figure 6:
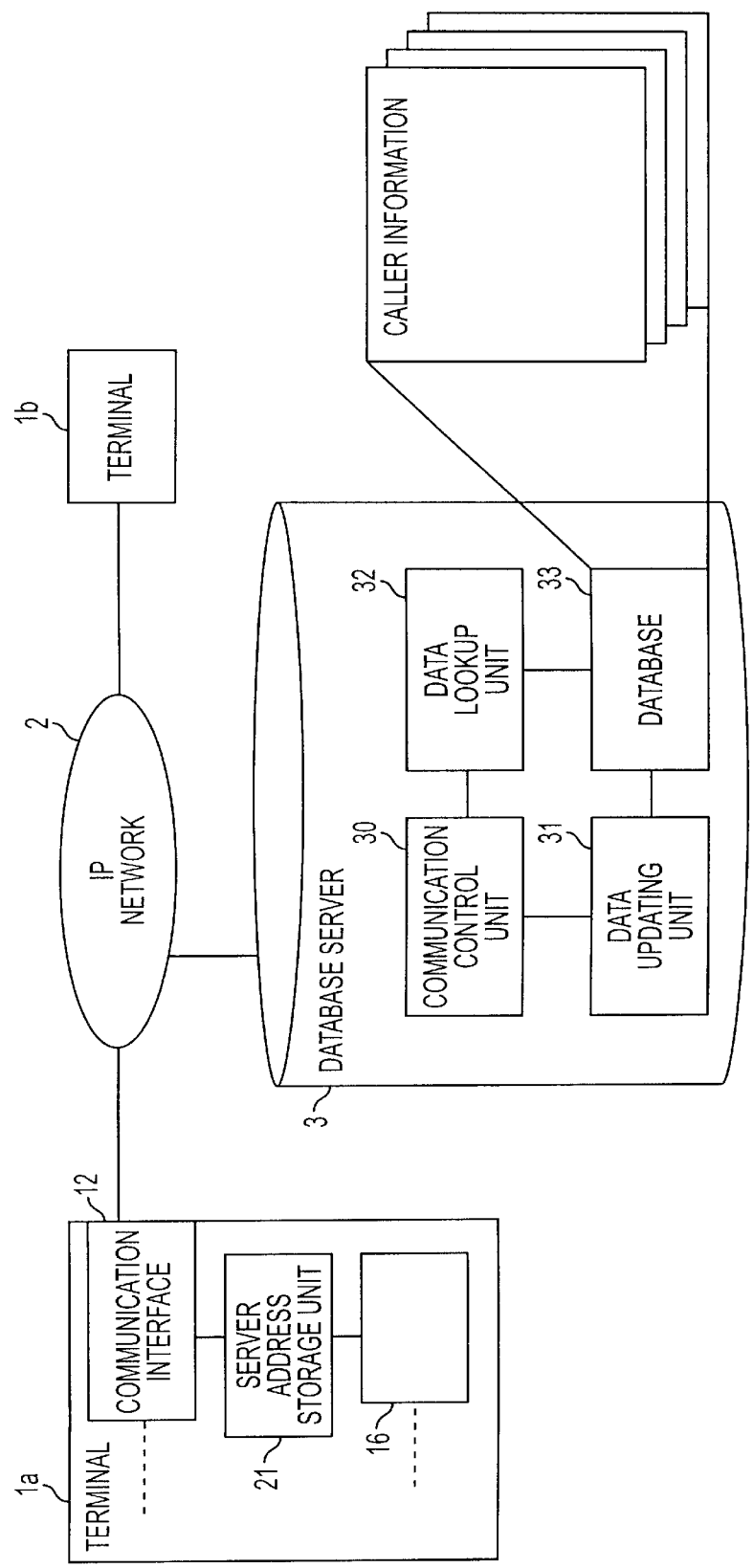
FIG. 6 is a diagram showing a sixth fundamental composition of the communication system of the present invention.

FIG. 6 is a diagram showing the sixth fundamental composition of the communication system of this invention. Shown in this sixth fundamental composition is a common telephone directory database system. In the diagram, 1*a* is the calling terminal, 1*b* is the called terminal, and 2 is an IP network; some of the interior of terminals 1*a*, 1*b* is not pictured, but as in FIG. 5 above (it has caller information format setting unit 20 inside the terminal), it has parts denoted by the symbols 10–18, 20. What is different from FIG. 5 is that a database server 3 is newly provided on the IP network, and a server address storage unit (21) is added between communication interface 12 of terminal 1*a* (likewise 1*b*) and caller information transmission and reception control unit 16. In database server 3, 30 is a communication control unit, 31 is a data updating unit, 32 is a data lookup unit, and 33 is a database in which the caller information of each terminal is stored.

In the system of FIG. 6, when the caller information stored in each terminal is updated, the shared database server 3 is called out from communication interface 12 using the server address previously stored, by setting, etc., in server address storage unit 21, and when the caller information is transferred, data updating unit 31 is activated from communication control unit 30 and updates database 33. This database is able to share between the terminals the latest caller information at all times, and can be used by applications such as the common telephone directory or caller lookup. And because the format of the stored caller information is made uniform, lookup can be done by data lookup unit 32.

Figure 7:
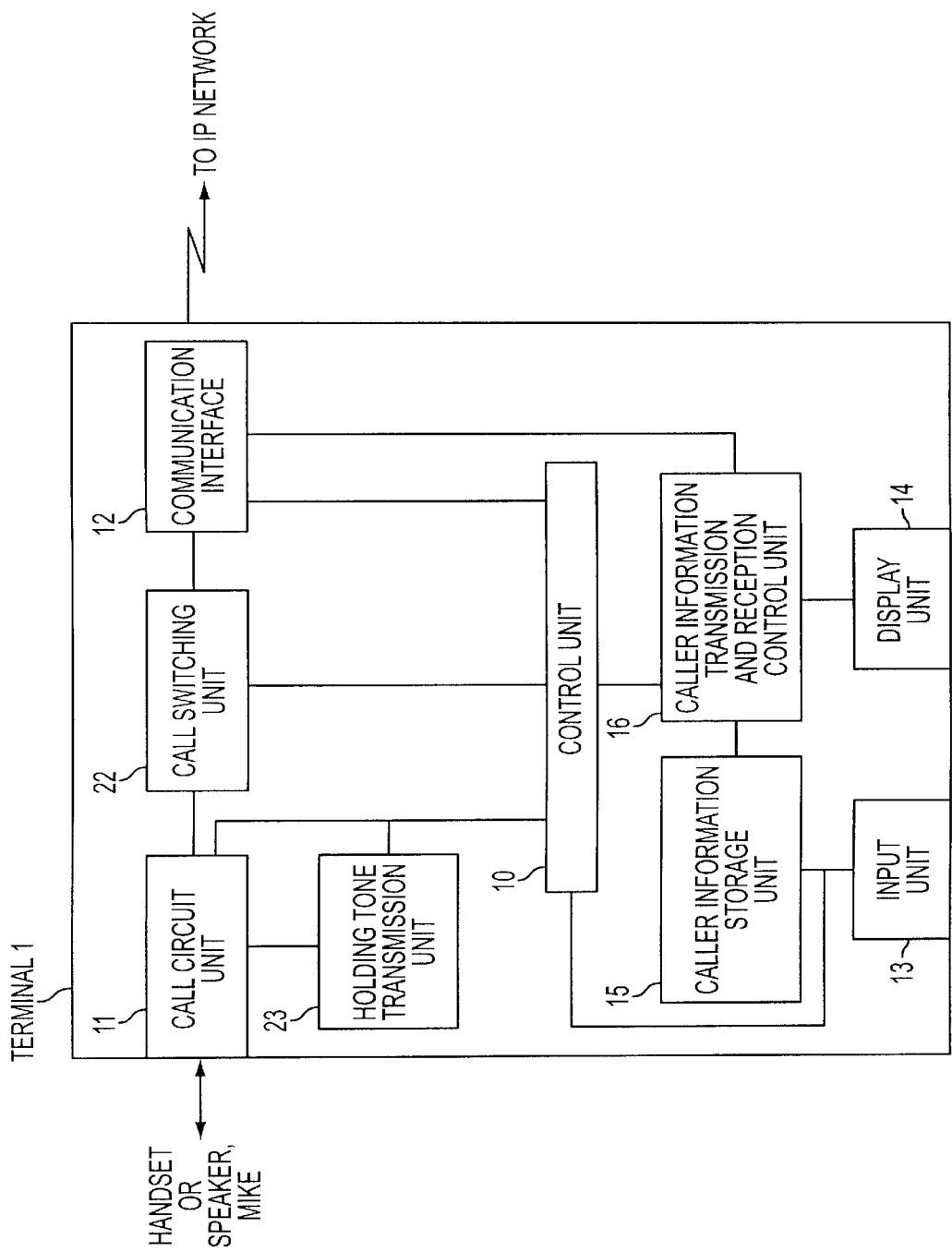
FIG. 7 is a diagram showing a terminal of a seventh fundamental composition of the communication system of the present invention.

FIG. 7 shows the seventh fundamental composition of the communication system of this invention. In the diagram, 1 denotes a terminal and corresponds to 1a, 1b in FIG. 1. Symbols 10–16 in terminal 1 are the same as the parts denoted by the same symbols in FIG. 1. What is different from FIG. 1 is that a call switching unit 22 and a holding tone transmission unit 23 are provided inside terminal 1.

When the user of terminal 1 is carrying on a two-person conversation with another terminal via communication interface 12 and during the conversation receives a callout message from a third terminal, then, as when a new incoming call is received, caller information is transmitted and received, and caller information on the new incoming-call party is received under the control of caller information transmission and reception control unit 16 and is displayed on display unit 14 of the terminal during the conversation. When caller information of the third terminal is displayed on display unit 14, a prompting message is displayed asking whether to switch the conversation to the third terminal, and upon input of instructions to switch the call, the voice communication (communication by VoIP voice packets) with the third terminal is switched to by switching call switching unit 22. At this time, a holding message is transmitted to the other party with whom up to then the conversation was being conducted. At the other terminal that receives the holding message, holding tone transmission unit 23 is activated, a holding tone is sent to call circuit unit 11, a holding tone is generated from the handset or speaker, and sending of voice packets from communication interface 12 to the IP network is stopped.

Figure 8:
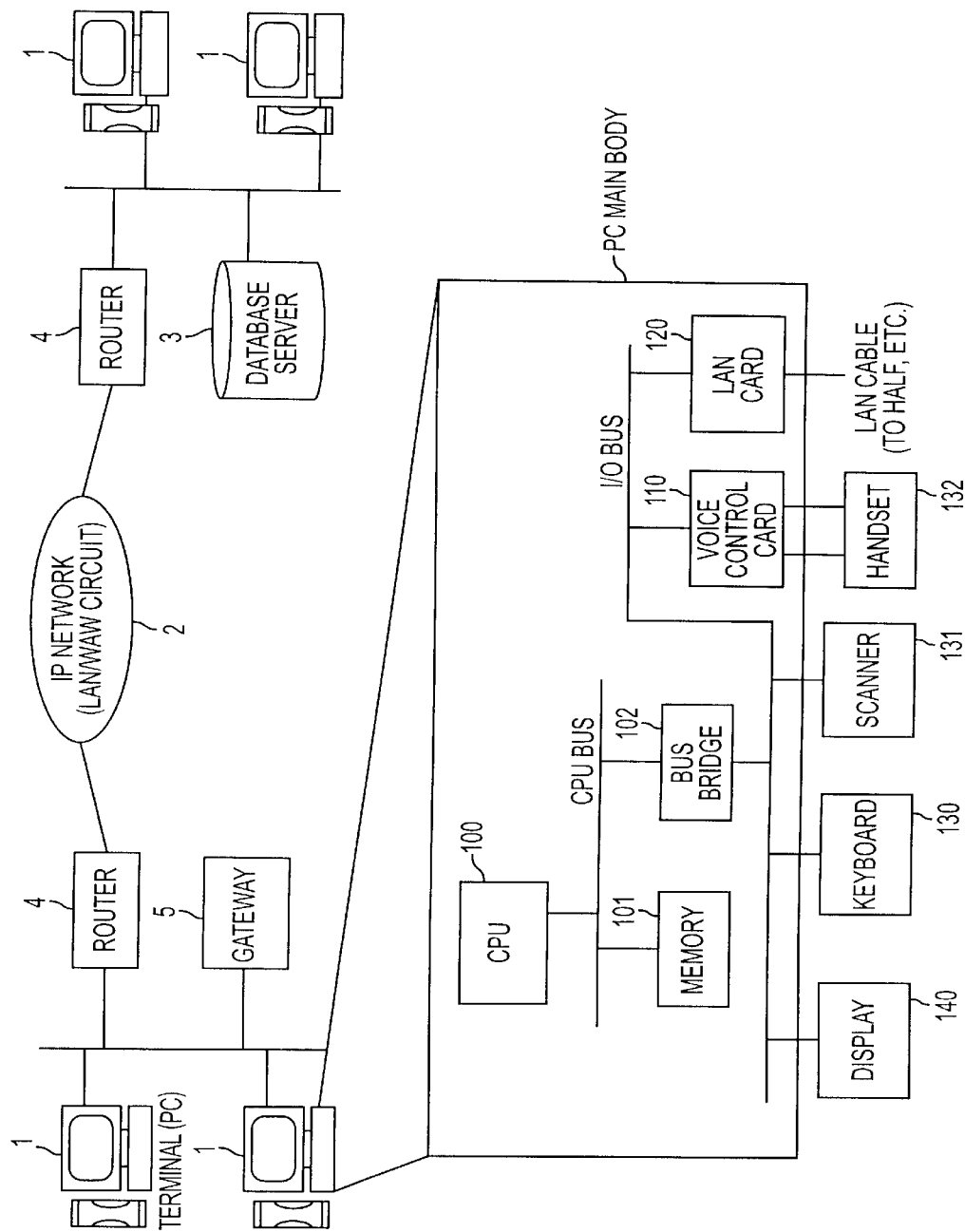
FIG. 8 is a diagram showing a system configuration of an embodiment of the present invention.

FIG. 8 shows an embodiment of the communication system of this invention. In FIG. 8, terminals 1, which are multiply provided, are the terminals that are connected to a LAN and have telephone functions, and their interior can be constituted by a personal computer (denoted by PC 1) having the hardware that is shown enlarged at the bottom of FIG. 8. That is, 100 in PC 1 is a CPU, 101 is a memory (including RAM, ROM), 102 is a bus bridge that connects the CPU bus and the I/O bus, 110 is a voice control card that is connected to the handset and converts the analog voice to digital and back-converts it, and 120 is a LAN card that performs control by which said terminal is connected with other terminals in the LAN to which it belongs, or to other terminals via a router or network, or to other LANs and by which packets (including voice packets) are transmitted. Also, multiple input-output devices are connected to the PC main body, 140 is a display, 130 is a keyboard, 131 is a scanner used for inputting images of callers as caller information, and 132 is a handset (a device for transmitting and receiving telephone calls).

Figure 9:
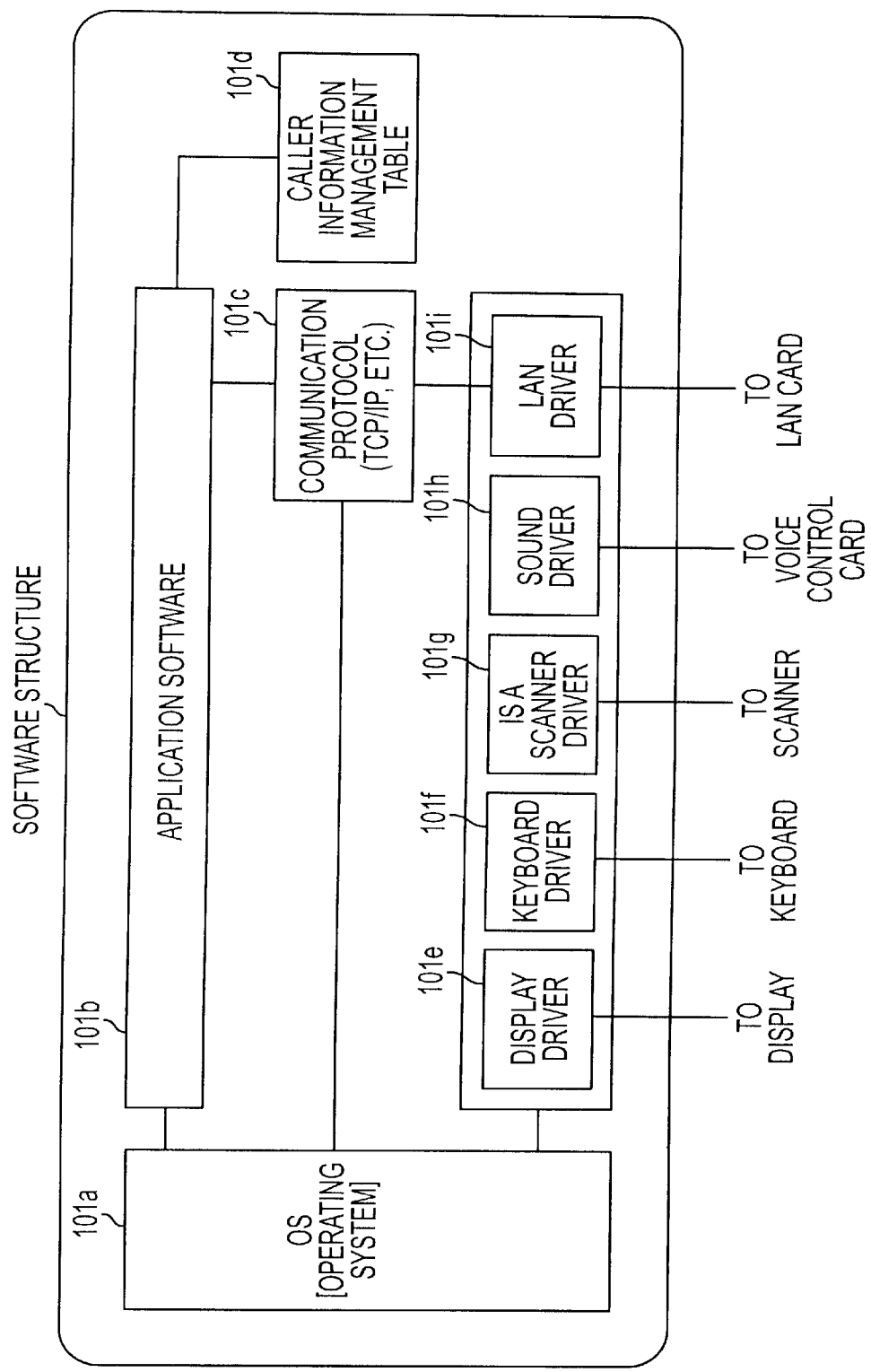
FIG. 9 is a diagram showing a software structure of the system according to the present invention.

Together with the operating system (OS), the software for realizing this invention is provided in memory 101 of the PC main body in FIG. 8. FIG. 9 shows the structure of the software. In FIG. 9, 101a is the operating system, 101b is application software for realizing various controls concerning caller information by this invention, 101c is a TCP/IP or other communication protocol by which communication control is done for voice conversations over a LAN or IP network, 101d is a caller information management table in which items of caller information are stored, 101e is a display driver, which is a program that performs control of display 140 shown in FIG. 8 above, 101f is a keyboard driver that performs control of aforesaid keyboard 130, 101g is a scanner driver that controls scanner 131, 101h is a sound driver that controls aforesaid voice control card 110, and 101i is a LAN driver that controls aforesaid LAN card 120.

The caller information display function according to this invention is built into the application software (program), and in order to realize each fundamental composition of this invention, it is realized by a combination of hardware and software; call circuit unit 11 shown in above FIGS. 1–7 corresponds to voice control card 110 and sound driver 101h shown in FIGS. 8 and 9, communication interface 12 corresponds to communication protocol 101c, LAN card 120, and LAN driver 101i shown in FIGS. 8 and 9, input unit 13 corresponds to keyboard driver 101f, keyboard 130, and scanner driver 101g shown in FIGS. 8 and 9, and display unit 14 corresponds to display driver 101e and display 140 shown in FIGS. 8 and 9. In this example, a scanner is used for input of image information, but it is also possible to use an image file such as JPEG.

FIGS. 10–23 show for the system of FIG. 8, the processing flow charts for realizing the various control that corresponds to each fundamental composition of FIGS. 1–7, by terminals having the composition shown in FIGS. 8 and 9. This processing flow is described using the names of the functional blocks shown in FIGS. 1–7.

Figure 10:
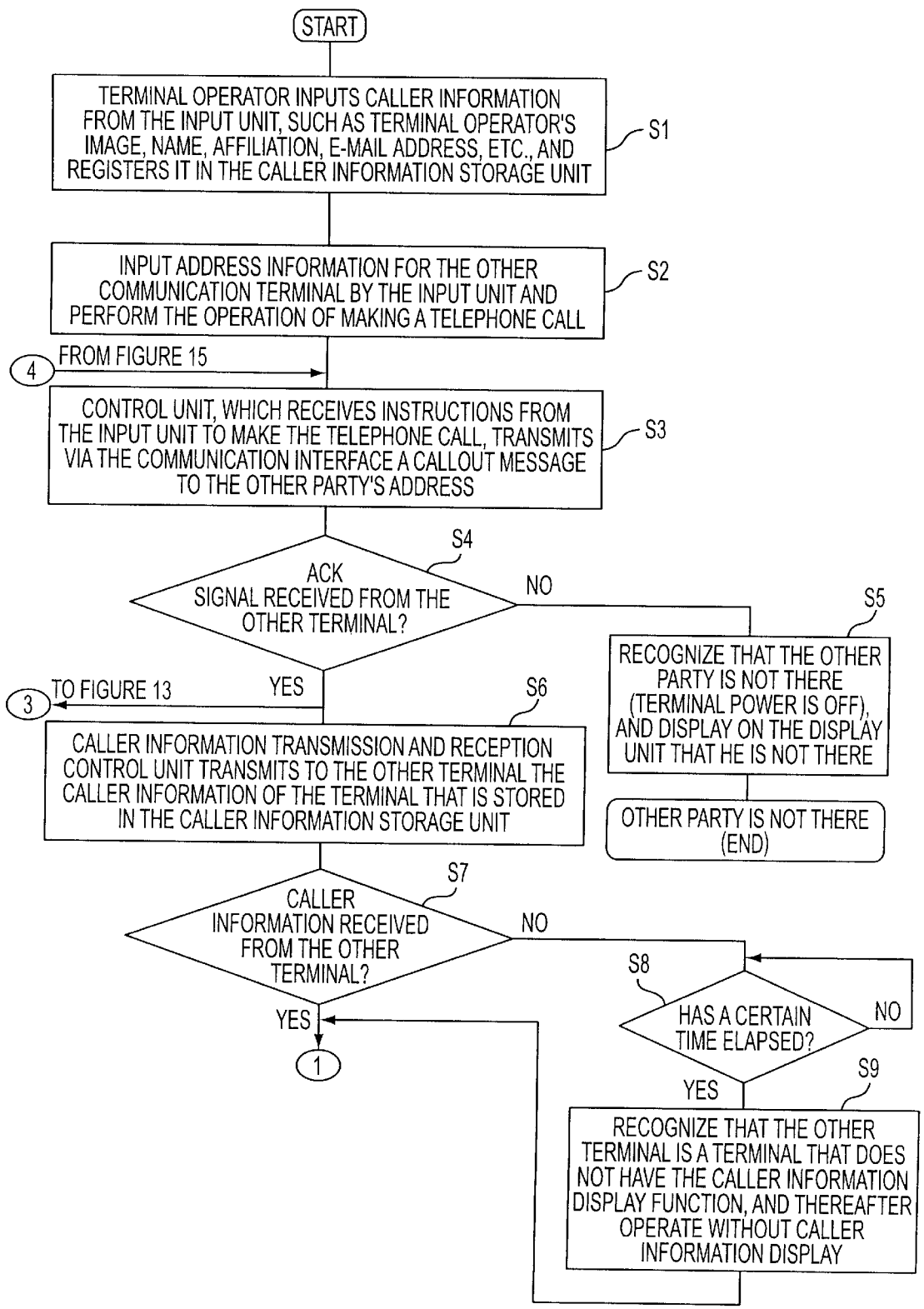
FIG. 10 is a diagram showing a processing flow chart (part 1) of the calling terminal according to the first fundamental composition.
Figure 11:
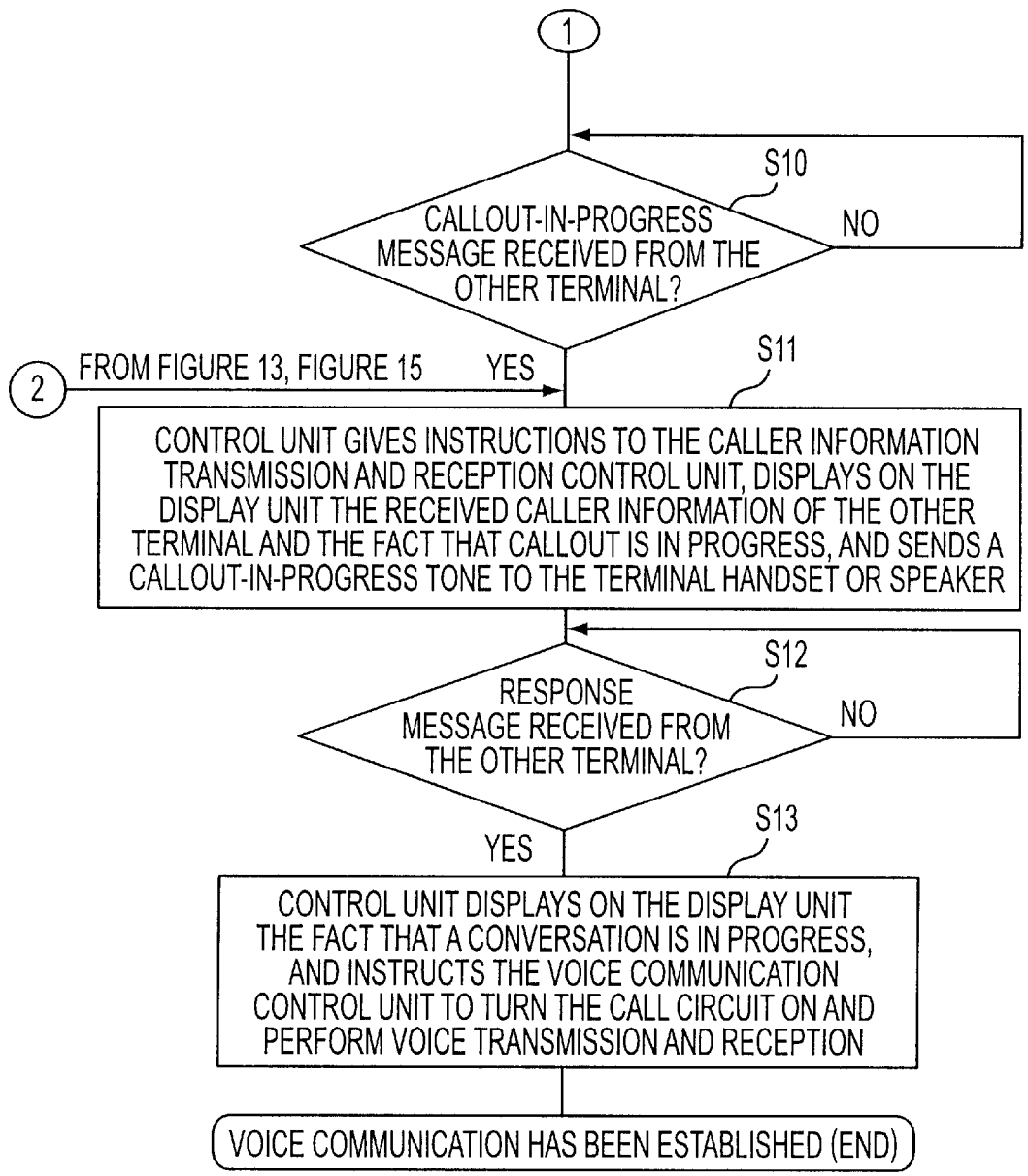
FIG. 11 is a diagram showing the processing flow chart (part 2) of the calling terminal according to the first fundamental composition.
Figure 12:
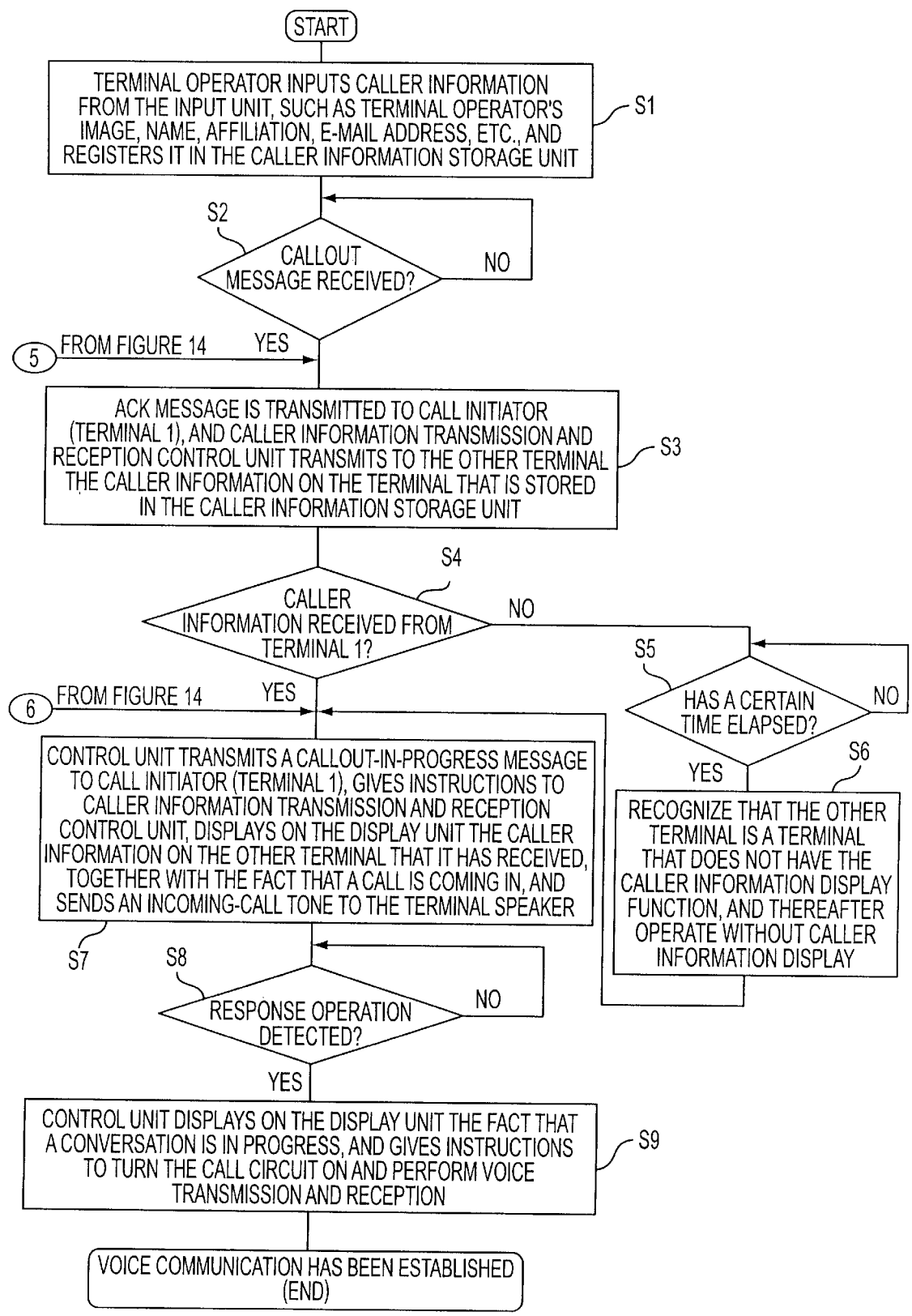
FIG. 12 is a diagram showing a processing flow chart of the called terminal according to the first fundamental composition.

FIGS. 10–12 show the processing flow chart for establishing voice communication by the first fundamental composition of the terminal (see FIG. 1); FIGS. 10 and 11 give the processing flow (part 1), (part 2) for the calling terminal comprising the first fundamental composition, and FIG. 12 gives the processing flow of the calling terminal according to the first fundamental composition.

To explain briefly the processing of calling terminal as shown in FIGS. 10 and 11, when the operator of the calling terminal inputs his image, name, etc. from the input unit, it is registered in the caller information storage unit (15 in FIG. 1) (S1 in FIG. 10), and when the operation to make a telephone call is carried out by inputting from the input unit the address information of the other communication terminal (S2), a callout message is transmitted to the other party's address via communication interface (12 in FIG. 1) (S3). Then it is decided whether an ACK signal (a signal denoting acceptance) has been received from the other terminal (S4 in FIG. 10); if it has not been received, a display is made on the display unit (14 in FIG. 1) as absence of the other party, and the matter ends (S5 in FIG. 10), but if it has been received, the caller information transmission and reception control unit transmits to the other terminal the caller information of the terminal that is stored in the caller information storage unit (S6).

Then it is decided whether caller information has been received from the other terminal (S7 in FIG. 10); if it has not been received, one waits for a certain time to elapse (S8), declares that the other terminal does not have a caller information display function, and thereafter causes operation without the display of caller information (S9). If caller information is received from the other terminal, next it is decided whether a callout-in-progress message has been received from the other terminal (S10 in FIG. 11); when it is received, callout-in-progress is displayed, together with the caller information of the other terminal that has been received, on the caller information transmission and reception control unit (16 in FIG. 1), and a callout-in-progress tone (ringback tone) is sent to the terminal handset or speaker (S11). Then it is decided whether a response message has been received from the other terminal (S12 in FIG. 11); if it is received, conversation-in-progress is displayed on the display unit, the call circuit is turned on with respect to the call circuit unit (11 in FIG. 1), and instructions are given to perform voice transmission and reception (13 in FIG. 11), thus establishing voice communication.

In the processing flow chart of the calling terminal shown in FIG. 12, when the operator of the called terminal, like the aforesaid calling terminal, inputs his image, name, etc., it is registered in the caller information storage unit (S1 in FIG. 12), then one waits for a callout message from the calling side (S2); if it is received, an ACK message is transmitted to the calling side and called-side caller information is transmitted to the other party (S3). Then it is decided whether caller information has been received from the calling side (S4 in FIG. 12); if it has not been received after a certain length of time has passed (S5), thereafter the operation proceeds without the display of caller information (S6), and one jumps on to S7. If caller information is received, a callout-in-progress message is transmitted to the calling side, incoming-call-in-progress is displayed, together with the caller information of the other terminal that has been received, on the caller information transmission and reception control unit, and an incoming-call tone is sent to the terminal speaker (S7). Thereupon, it is decided whether a response operation has been performed by the operator (S8 in FIG. 12); if there is a response operation, it is displayed that it is conversation-in-progress, the call circuit is turned on with respect to the call circuit unit, and instructions are given to perform voice transmission and reception (S9), thus establishing voice communication.

Thus, by the respective processing flow of the calling terminal and called terminal shown in FIGS. 10, 11, and 12, caller information to be displayed to the other party can be transferred and displayed in the communication setup procedure, and by transmitting caller information on the call recipient to the calling terminal and not just displaying on the called terminal caller information on the initiating caller, it is possible to carry out a telephone conversation after both the caller and call recipient display caller information on the other party and recognize the other party. Also, at this time, having seen the caller information on the other party, one may decide not to have a telephone conversation.

Figure 13:
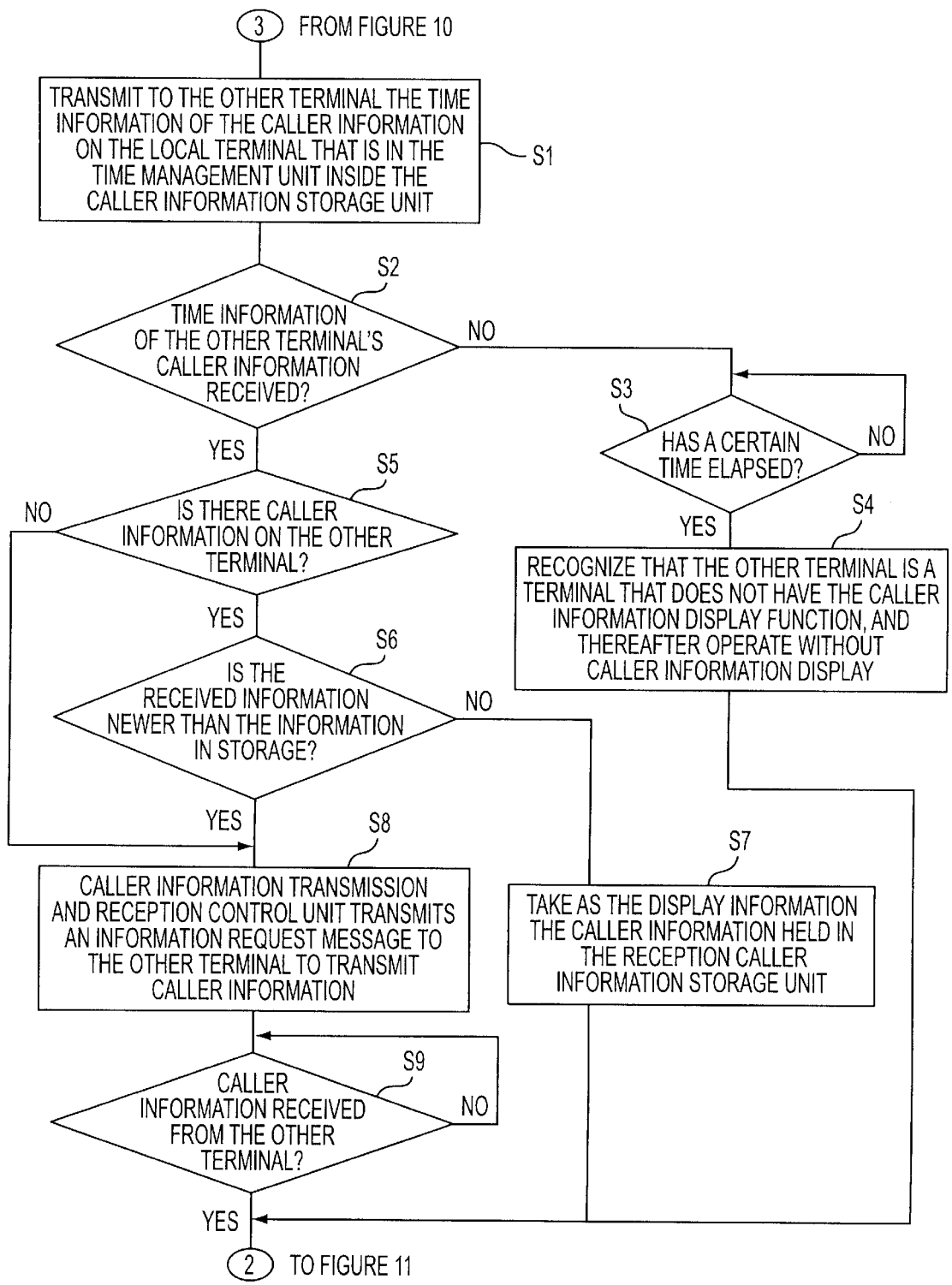
FIG. 13 is a diagram showing a processing flow chart of the calling terminal according to the second fundamental composition.
Figure 14:
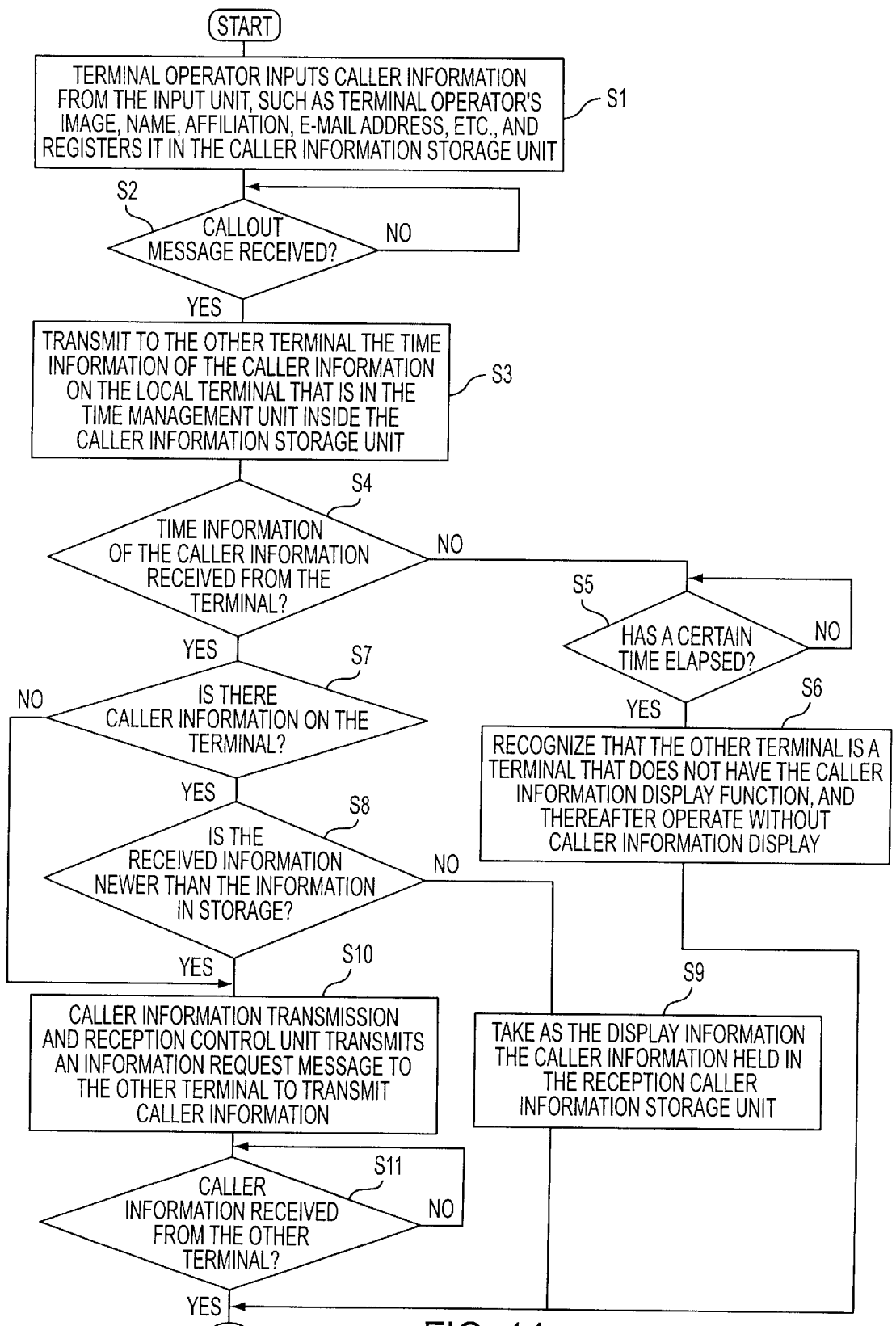
FIG. 14 is a diagram showing a processing flow chart of the called terminal according to the second fundamental composition.

FIGS. 13 and 14 show the processing flow charts for establishing voice communication by the system of the second fundamental composition (see FIG. 2); FIG. 13 is the processing flow of the calling terminal according to the second fundamental composition, and from S1 to S4 it is the same processing as the processing flow of the calling terminal according to the first fundamental composition shown above in FIG. 10, and it is composed so that it is branched to from S4 of FIG. 10 as indicated by <3>, and from final step S9 shown in FIG. 13 it returns to S11 of FIG. 11 by path <2>.

When by S1 to S4 of FIG. 10 a call is made at the calling terminal and an ACK signal from the other terminal is received, the time information of the caller information of the local terminal in the time management unit (150 in FIG. 2) is transmitted to the other terminal (S1 in FIG. 13), and it is decided whether time information of the caller information from the called terminal has been received (S2); if it has not been received, it is decided whether a certain length of time has elapsed (S3), and when a certain length of time has passed, the decision is made to proceed on the assumption that the other terminal does not have a caller information display function (S4), and one jumps to S11 in FIG. 11. And if time information of the caller information from the calling terminal is received, it is decided whether said caller information is in the reception caller information storage unit (17 in FIG. 2) (S5 in FIG. 13); if it is not there, one jumps to S8, which is described below, and if it is there, one compares the time information that has been received this time with the time information held in the time management unit (170 in FIG. 2) of said caller information of the reception caller information storage unit and decides whether the received time information is newer (S6 in FIG. 13); if it is not newer, one concludes that it is information to display the caller information held in the reception caller information storage unit (S7). If the received information is newer, the caller information transmission and reception control unit (16 in FIG. 2) transmits to the other terminal an information request message to transmit the caller information (S8 in FIG. 13), and one monitors that the caller information is received from the calling terminal (S9); if it is received, one jumps to the processing of S11 in aforesaid FIG. 11 and performs the subsequent processing.

FIG. 14 is the processing flow of the called terminal.

In the called terminal of the second fundamental configuration, as in S1, S2 of the processing flow chart (FIG. 12) of the above first fundamental called terminal, caller information is registered in the local terminal, reception of a callout message is monitored, and when a callout message is received, the time information of the caller information of the local terminal in the time management unit of the caller information storage unit (15 of FIG. 2) in which caller information of the local terminal is stored is transmitted to the other terminal (S3 in FIG. 14), and it is decided whether time information of the caller information has been received from the other terminal (the calling terminal) (S4). If time information is not received within a certain length of time, the other terminal operates on the assumption that it has no display function for caller information (S5, S6 in FIG. 14), and when time information of the caller information is received from the calling terminal, it is decided whether the caller information of said calling terminal is present in the reception caller information storage unit (17 in FIG. 2) in which the previously received information is stored (S7 in FIG. 14). If it is not there, one jumps to the processing of S10, which is described below, and if it is there, one decides whether the received time information is newer than the time information of the time management unit (170 in FIG. 2) of the reception caller information storage unit (S8); if it is not newer, the held caller information is determined to be the display information (S9). If the received time information is newer, an information request message is transmitted so that the caller information transmission and reception control unit transmits the caller information to the other terminal (S10 in FIG. 14), and one monitors the reception of caller information from the other terminal (S11); if it is received, one jumps to step S7 of the processing flow (FIG. 12) of the first fundamental calling terminal by the path indicated by <6>, and the subsequent processing is executed.

Thus by the processing flows of the calling terminal and called terminal shown in FIGS. 13 and 14, the amount of communication in the transmission and reception of caller information can be reduced, the communication time can be shortened, and the latest caller information can be displayed, because a request for transmission of caller information is made to the other party only if there is no caller information on the other terminal at the local terminal, or if there is, it is old information.

Figure 15:
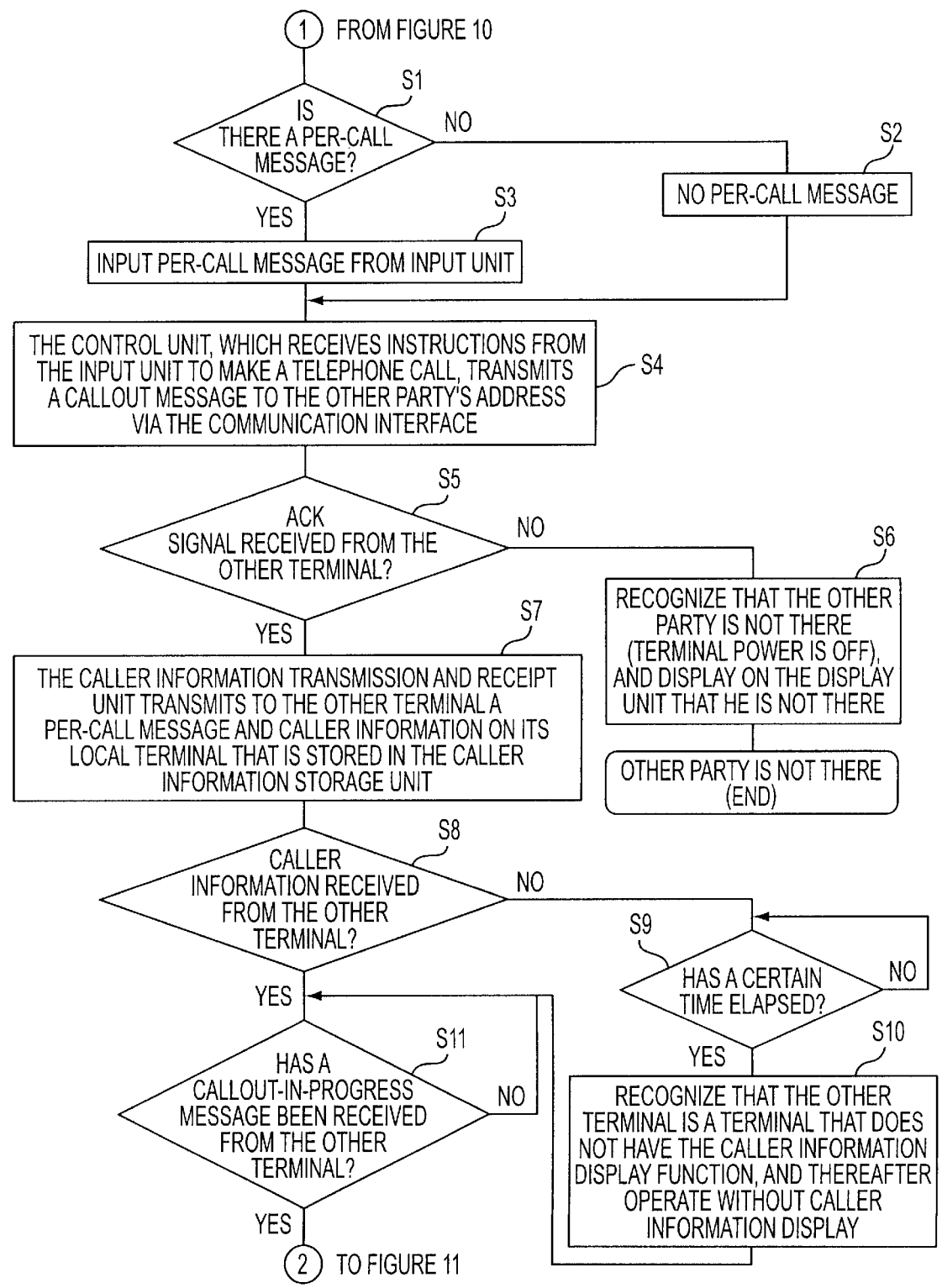
FIG. 15 is a diagram showing a processing flow chart of the calling terminal according to the third fundamental composition.
Figure 16:
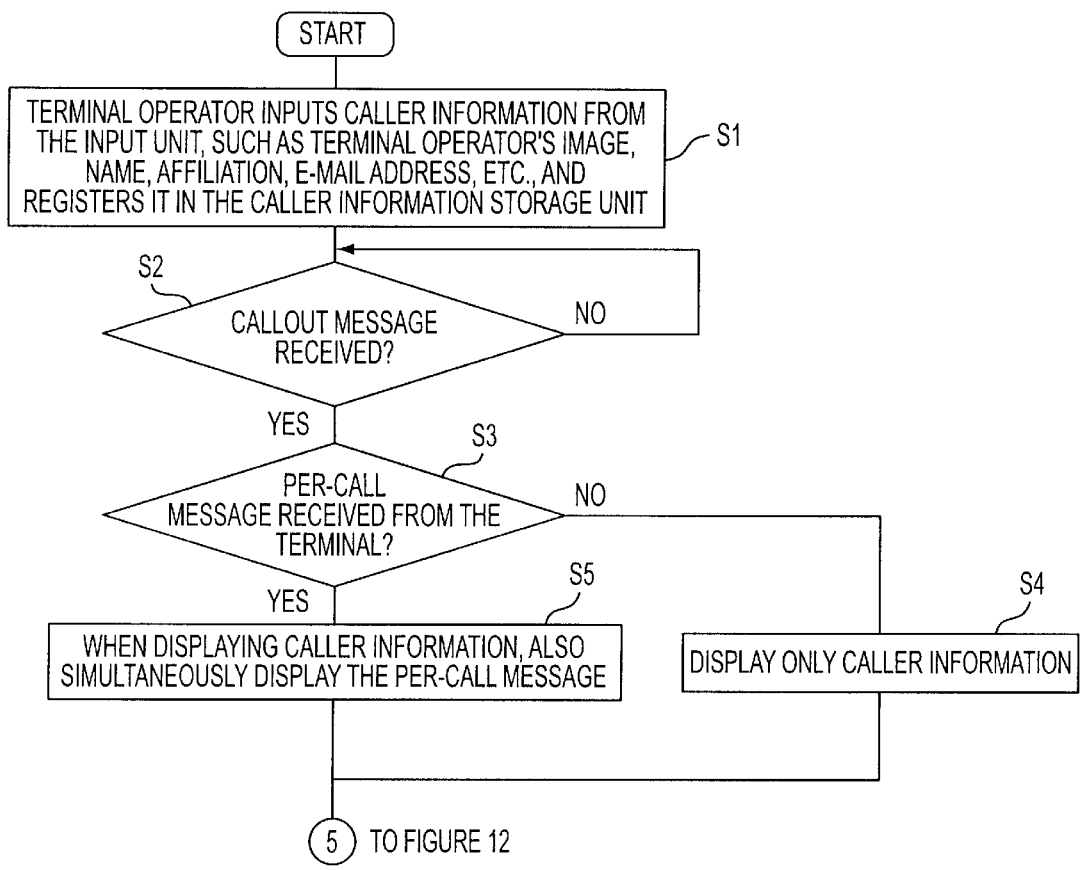
FIG. 16 is a diagram showing a processing flow chart of the called terminal according to the third fundamental composition.

FIGS. 15 and 16 show the processing flow for establishing voice communication by the third fundamental composition (see FIG. 3); FIG. 15 is the processing flow of the calling terminal according to the third fundamental composition, and up to S1 and S2 it is the same processing as the processing flow of the calling terminal according to the first fundamental composition shown above in FIG. 10, and the flow is such that it is branched to from S2 of FIG. 10 as indicated by <4>, and from final step S11 shown in FIG. 15 it returns to S11 of FIG. 11 by path <2>.

After one's own caller information is registered on the calling terminal side by S1 and S2 of FIG. 10, when one inputs the address of the other communication terminal and performs a calling operation, processing is done to decide whether there is a per-call message (a message expressing the degree of urgency or nature of the conversation, which is conveyed when voice communication is established before the other party responds) (S1 in FIG. 15). In this decision, the determination is made according to whether the presence or absence of a per-call message is displayed and whether input has been done that selects "yes". If there is no per-call message, one jumps to S4, which is described below, and if there is a per-call message, when the per-call message is input by the input unit (S3 in FIG. 15), a callout message is transmitted to the other party's address via the communication interface (S4). Then one monitors the reception of an ACK signal from the other terminal (S5 in FIG. 15), and if none is received, it is recognized that the other party is not present (the terminal power is off), this absence is displayed (S6), and the processing is ended. If an ACK signal is received, the caller information transmission and reception control unit (16 in FIG. 3) transmits to the other terminal a per-call message along with its local terminal caller information stored in the caller information storage unit (15 in FIG. 3) (S7 in FIG. 15). Thereupon, one waits for reception of the caller information from the other terminal, and if it is not received after a certain length of time, it is set so that subsequent operation is done on the assumption that the other terminal does not have any caller information display function (S9 and S10 in FIG. 15), and if caller information of the other terminal is received, one waits for reception of a callout-in-progress message from the other terminal (S11), and when this is received, one jumps to S11 of FIG. 11 above, and the subsequent processing is executed.

FIG. 16 is the processing flow chart of the called terminal according to the third fundamental composition. In the called terminal, once the operator inputs caller information from the input unit and registers it in the caller information storage unit (S1 in FIG. 16), one monitors reception of a callout message (S2), and if it is received, one decides whether a per-call message has been received from the calling terminal (S3). If a per-call message is not received, one displays only the caller information on the display unit (S4 of FIG. 16), and if it is received, when displaying the caller information, one simultaneously displays the per-call message as well (S5). Thereafter, one jumps to step S3 of FIG. 12, and the subsequent processing is executed.

By the respective processing of the calling terminal and called terminal shown in FIGS. 15 and 16, in the communication setup procedure a per-call message is transferred to the other party, allowing the other party of the calling terminal that receives this to see a display of the caller information and the per-call message and know the nature, etc. of the call before answering.

Figure 17:
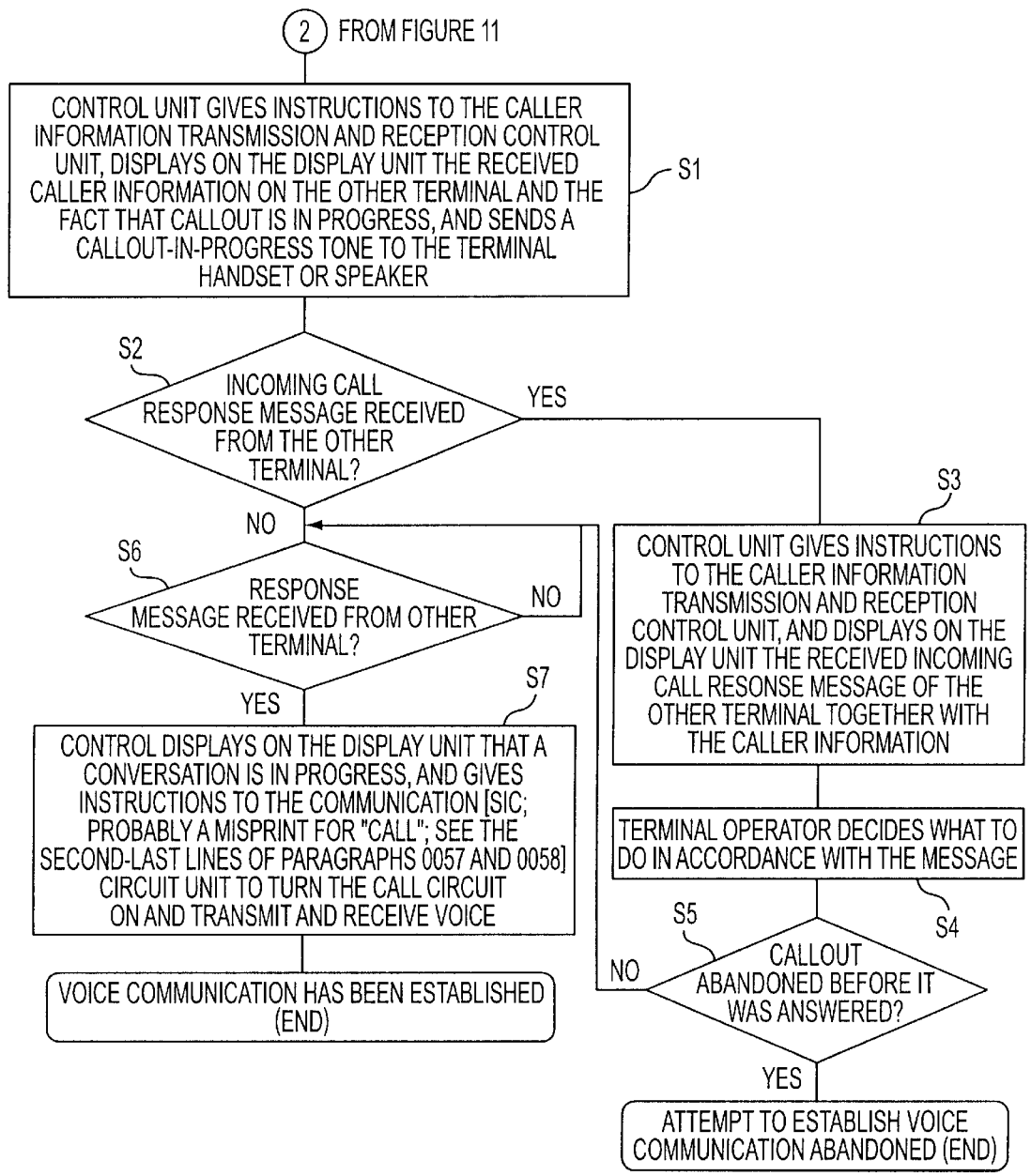
FIG. 17 is a diagram showing a processing flow chart of the calling terminal according to the fourth fundamental composition.
Figure 18:
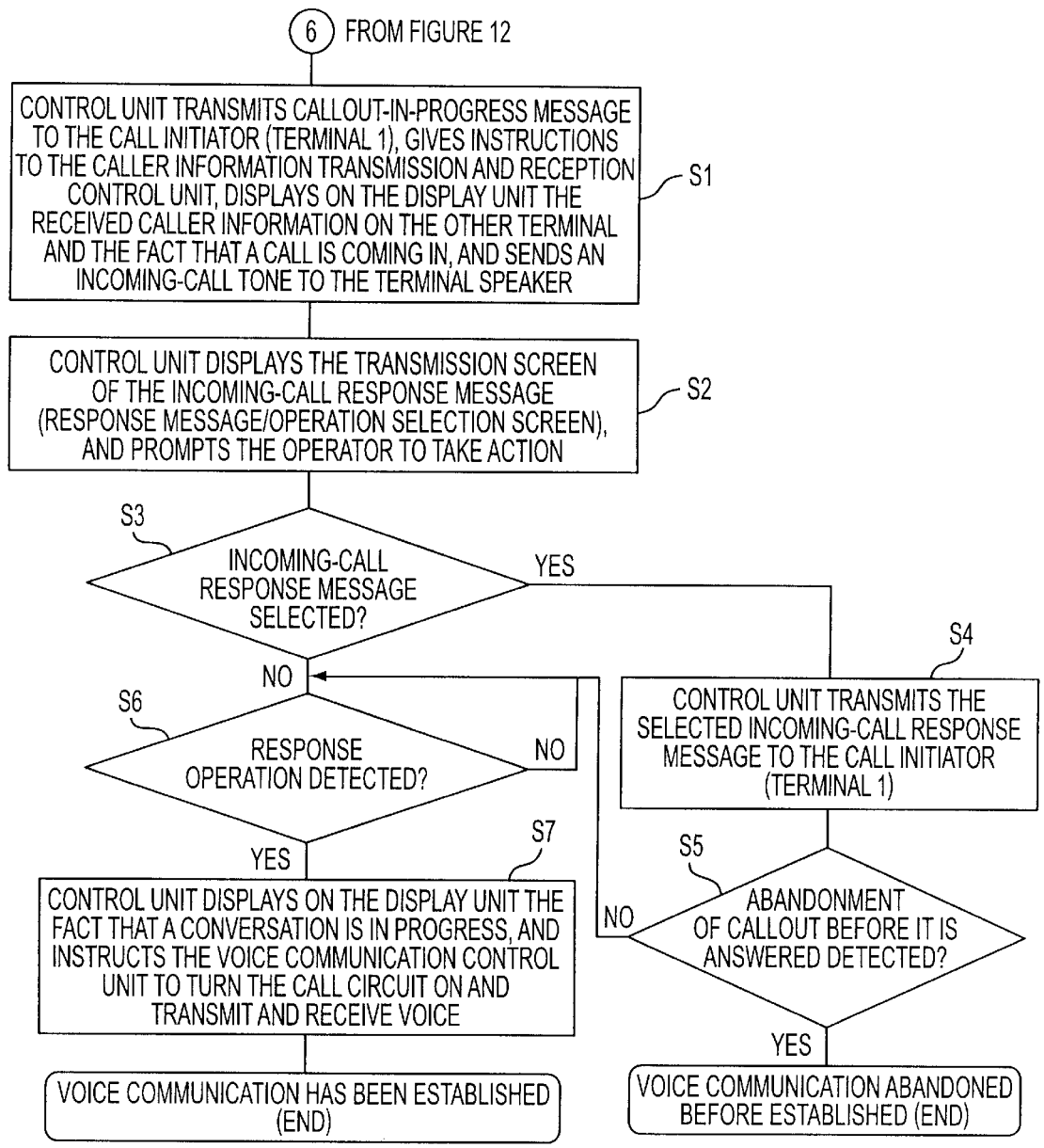
FIG. 18 is a diagram showing a processing flow chart of the called terminal according to the fourth fundamental composition.

FIGS. 17 and 18 show the processing flow for establishing voice communication by the fourth fundamental composition (see FIG. 4).

FIG. 17 is the processing flow chart of the calling terminal according to the fourth fundamental composition, and from S1 to S10 it is the same processing as the processing flow of the calling terminal according to the first fundamental composition shown above in FIGS. 10 and 11, it is branched to from S11 of FIG. 11 by the path indicated by <2>, and it jumps to the processing of FIG. 15. Here, instructions are given to caller information transmission and reception control unit (16 in FIG. 4), the received caller information on the other terminal is displayed on the display unit together with the fact that it is callout-in-progress, a callout-in-progress tone is sent to the terminal handset or speaker (S1 in FIG. 17), and it is decided whether an incoming call response message has been received from the other terminal (S2). If an incoming call response message is received, instructions are given to the caller information transmission and reception control unit, the incoming call response message of the other terminal that is received is displayed on the display unit together with the caller information (S3 in FIG. 17), and the operator of the local terminal decides on the processing according to the message (S4) and decides whether to abandon the callout before it is answered (S5). If abandoned before it is answered, the processing is terminated, but if it is not abandoned or if an incoming call response message is received from the other terminal in S2 above, one monitors reception of a response message from the other terminal (S6). When a response message is received, it is displayed that a conversation is in progress, instructions are given to the call circuit unit (11 in FIG. 4) to turn the call circuit on and transmit and receive voice (S7 in FIG. 17), and voice communication is established.

FIG. 18 is the processing flow chart of the called terminal according to the fourth fundamental composition; from S1 to S4 it is the same processing as the processing flow of the called terminal according to the first fundamental composition shown above in FIG. 12; when caller information is received from the terminal (if YES in S4 of FIG. 12), it is branched to by path <6>, and it jumps to the processing of FIG. 17; at the called terminal, it transmits a callout-in-progress message to the calling terminal, gives instructions to caller information transmission and reception control unit (16 in FIG. 4); the received caller information on the other terminal is displayed on the display unit together with the fact that it is incoming-call-in-progress, an incoming-call tone is sent to the terminal speaker (S1 in FIG. 18), whereupon an incoming call response message transmission screen (response message/operation selection screen) is displayed, prompting the operator to perform an operation (S2). Then it is decided whether an incoming message response message (a message including the reason or circumstances when the telephone cannot be answered for a reason such as that the call recipient is busy) has been selected (S3 in FIG. 18); if one is selected, the selected incoming call response message is transmitted to the caller (the calling terminal) (S4), a decision is made whether abandonment of the call before it was answered was detected (S5), and if abandonment before it was answered is detected, the processing is terminated, but if abandonment before being answered is not detected, then it is monitored whether a response operation (such as putting the handset off hook) has been detected, as in the case when an incoming call response message is not selected in S3 above (S6). If a response operation is detected, it is displayed on the display unit that a conversation is in progress, instructions are given to the call circuit unit to turn the call circuit on and transmit and receive voice (S7 in FIG. 18), and voice communication is established.

By the respective processing of the calling terminal and called terminal shown in FIGS. 17 and 18, if in the communication setup procedure the call recipient is unable to respond, the caller information of the calling terminal and a display to select an incoming call response message are displayed on the called terminal, informing the call initiator of the circumstances, etc. of being unable to respond, without actually responding.

Figure 19:
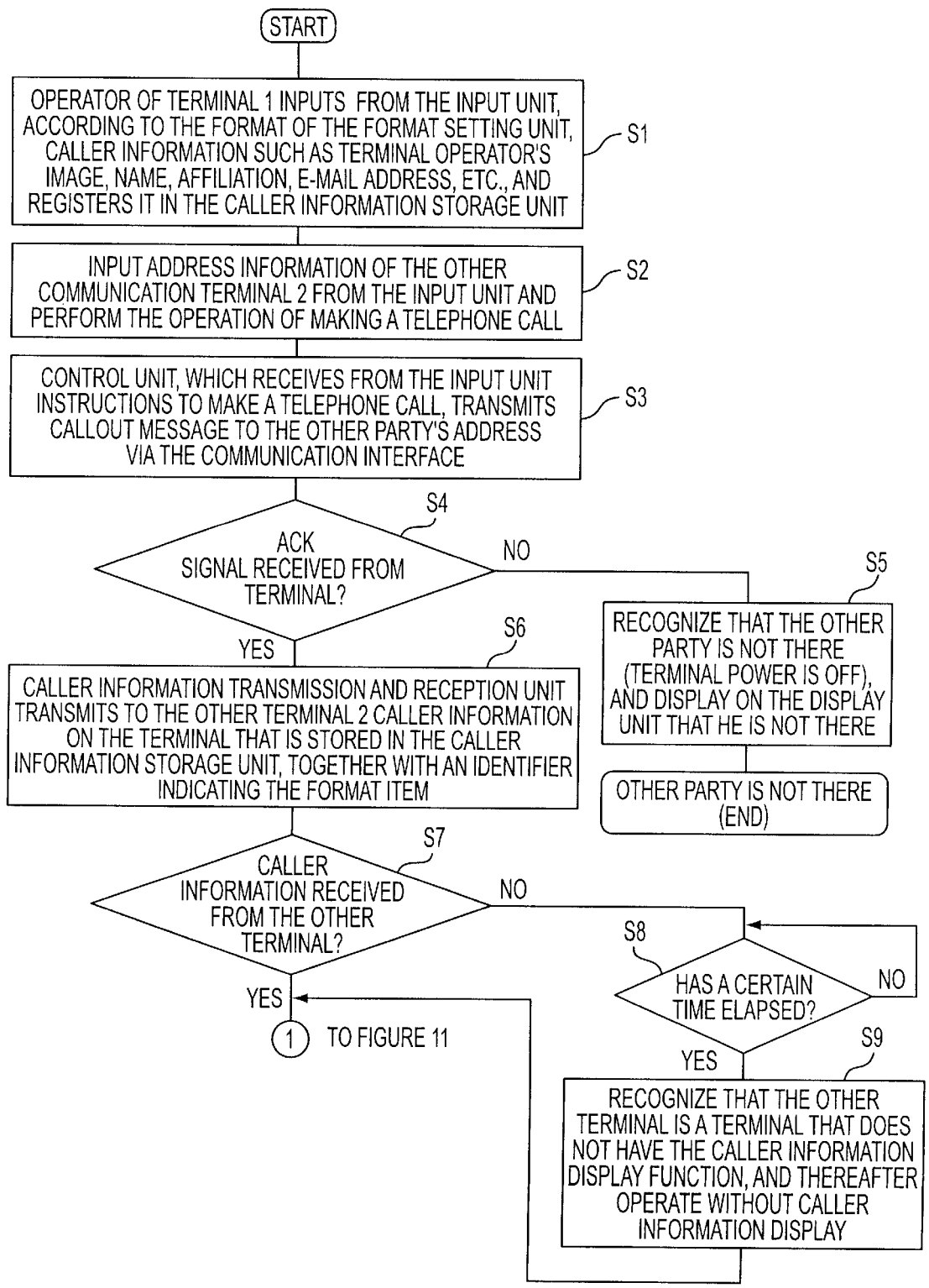
FIG. 19 is a diagram showing a processing flow chart of the calling terminal according to the fifth fundamental composition.

FIG. 19 shows the procedure for establishing voice communication according to the fifth fundamental composition (see FIG. 5); in particular, it shows the processing flow chart of the calling terminal according to the fifth fundamental composition.

The processing in steps S1–S5 of FIG. 19 is the same as in steps S1–S5 of the processing flow chart of the calling terminal in the first fundamental composition of FIG. 10, and a description thereof is omitted. In S4 in FIG. 19, when it is decided that an ACK signal has been received from the other terminal, the caller information transmission and reception control unit (16 in FIG. 5) transmits to the other terminal the caller information of the caller terminal stored in the caller information storage unit, together with an identifier indicating the format items (S6 in FIG. 19). Different identifiers are allocated in correspondence with the data types, such as one identifier to indicate photograph data and another identifier to indicate text data. Then, it is decided whether caller information has been received from the other terminal (S7); it is decided whether it is not received and a certain time elapses (S8), and if a certain time elapses, the other terminal is set to a terminal that does not have any caller information display function (S9), and it jumps to the next processing (path <1>). Also, even if caller information is received, it jumps by path <1>to the processing of S10 in FIG. 11 above, and the subsequent processing is carried out.

Figure 20:
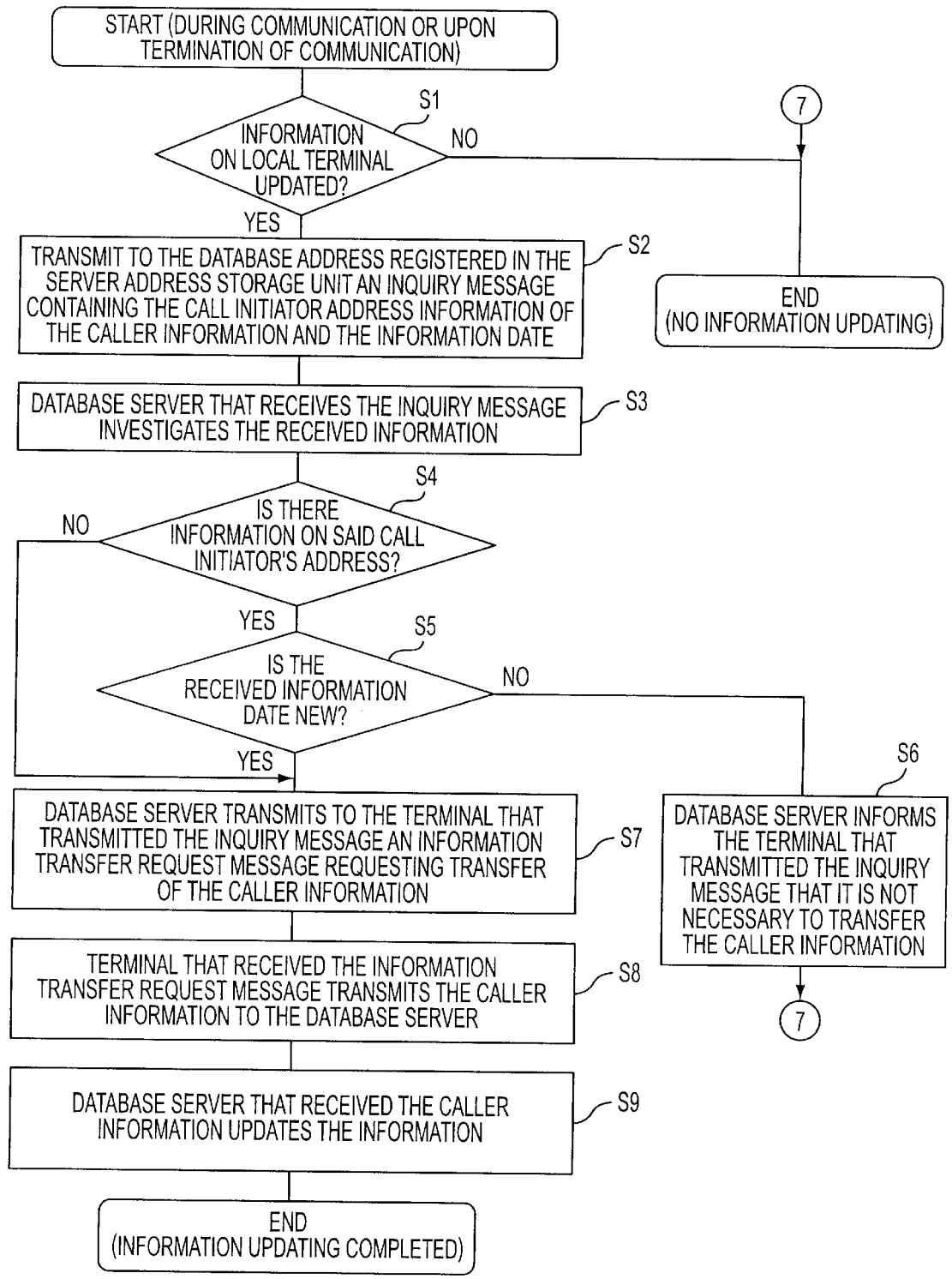
FIG. 20 is a diagram showing a processing flow chart of the information registration in a shared database according to the sixth fundamental composition.

FIG. 20 shows the processing flow chart of registering information in a common database database server according to the sixth fundamental composition (see FIG. 6), and it is executed by terminals connected over an IP network.

The processing of FIG. 20 is executed in the terminal while a conversation is in progress or when the conversation ends; it is decided whether the local terminal information has been updated (S1 of FIG. 20), and if there is no information updating, the processing is terminated, but if there is information updating, an inquiry message including the call initiator address information and information date of the caller information is transmitted to the database address that has been registered in the server address storage unit (21 of FIG. 6) (S2 of FIG. 20). Then the processing of steps S3–S7 is executed in the database server, and the server, which has received the inquiry message, looks over the received information (S3 of FIG. 20) and decides whether there is information on said call initiator address (S4); if there is not, it jumps to the processing of S7, which is described below, and if there is, it decides whether the received information date is new (S5). This date decision is the same as the time information according to the second fundamental [composition] shown in FIGS. 13 and 14 above; if the received information date is no different from the previously registered date, the database server informs the terminal that transmitted the inquiry message that no transfer of caller information is needed (S6 of FIG. 20), and if the received information date is new, the database server transmits to the terminal that transmitted the inquiry message a message requesting transfer of the caller information (S7). Then the terminal that receives the information transfer request message transmits the caller information to the database server (S8 of FIG. 20), and the database server that receives the caller information updates the information (S9) and terminates the information updating.

Thus by registering caller information on each terminal in the database server and keeping its content updated at all times., the latest caller information is stored, allowing it to be shared between the terminals and used for common telephone directory applications, and because the format of the stored caller information is uniform, lookup can be done taking the information as the key.

Figure 21:
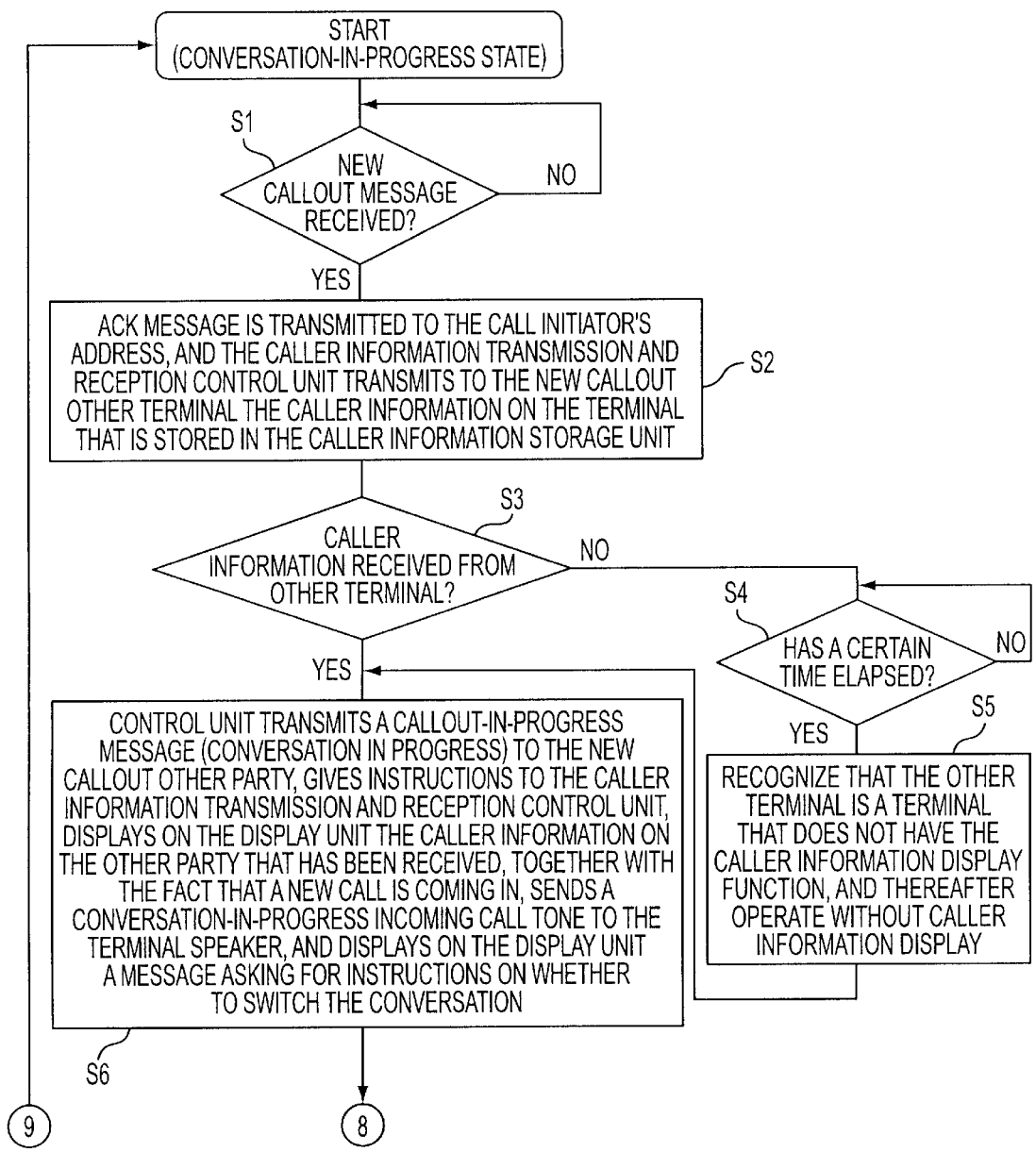
FIG. 21 is a diagram showing a processing flow chart of a new incoming call of a terminal in the midst of a conversation, according to the seventh fundamental composition.
Figure 22:
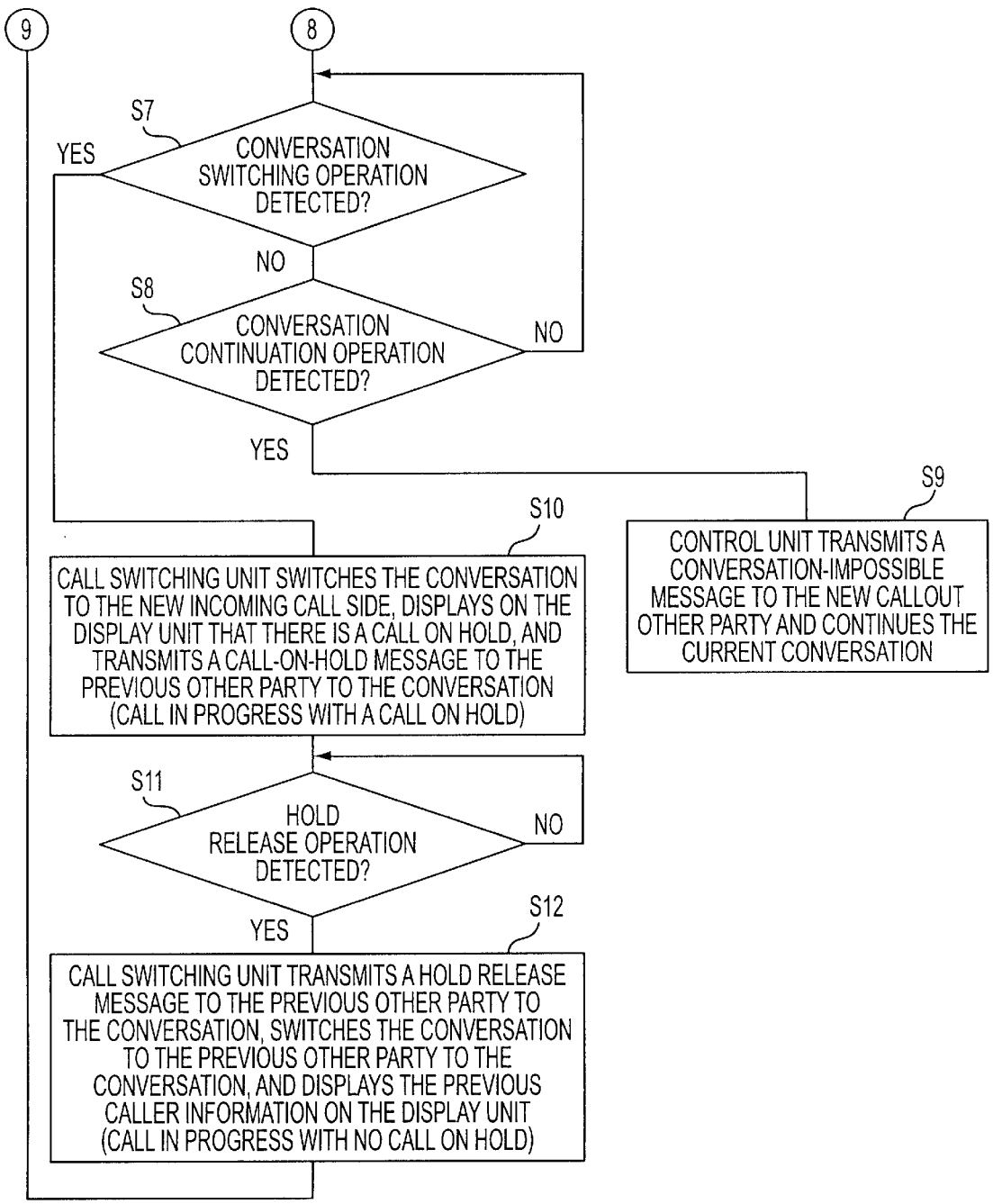
FIG. 22 is a diagram showing the processing flow (part 2) of a new incoming call of a terminal in the midst of a conversation, according to the seventh fundamental composition.
Figure 23:
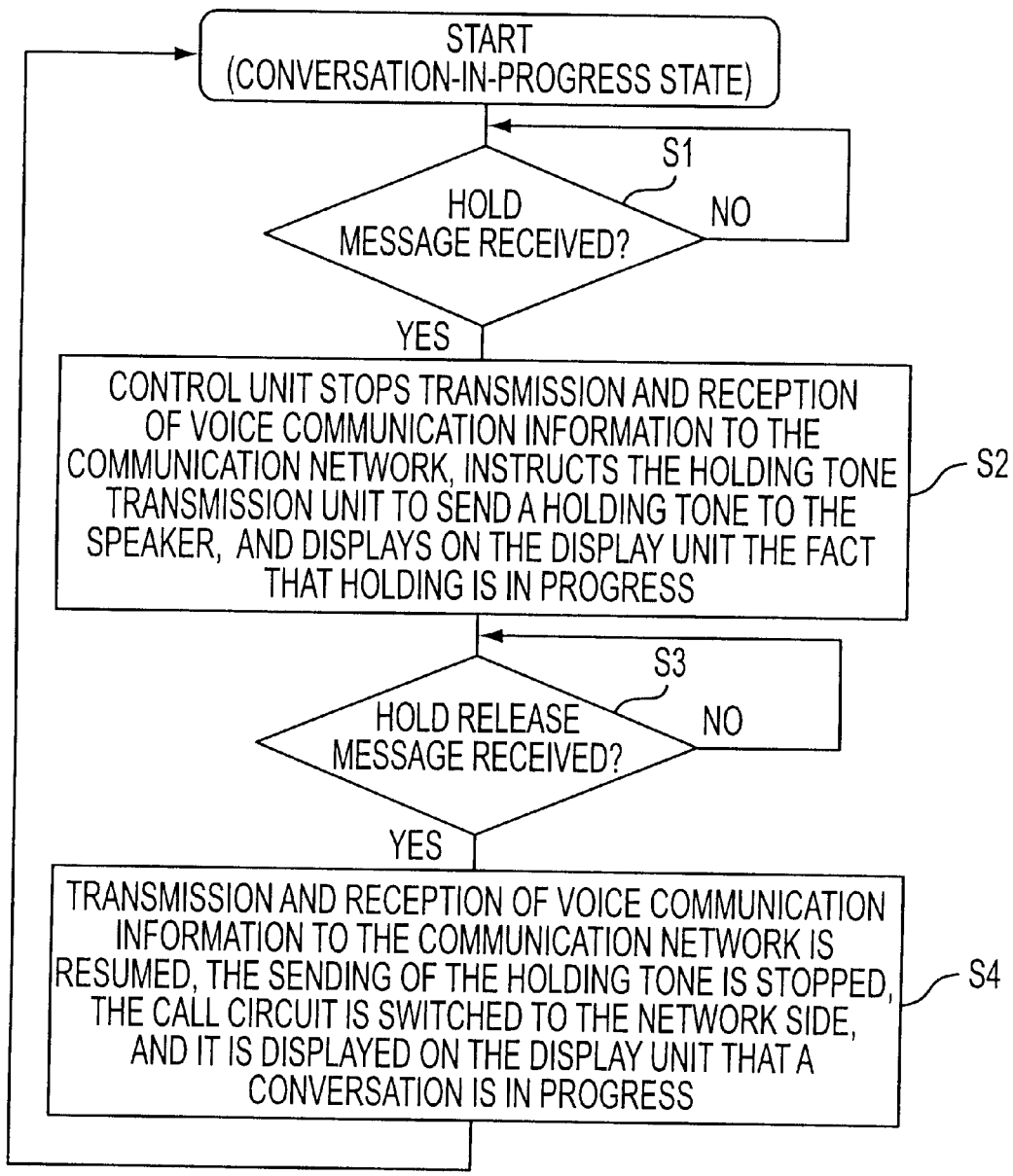
FIG. 23 is a diagram showing a processing flow chart of a terminal on hold, according to the seventh fundamental composition.

FIGS. 21–23 show the processing flow chart according to the seventh fundamental composition (see FIG. 7); FIGS. 21 and 22 are the processing flow charts (part 1 and part 2) for the reception of a new incoming call by a terminal in the midst of a conversation according to the seventh fundamental composition, and FIG. 23 is the processing flow chart of a terminal on hold according to the seventh fundamental composition.

The processing shown in FIGS. 21 and 22 is executed in the conversation-in-progress state; during a conversation, it is decided whether a new callout message has been received (S1 of FIG. 21); if it is received, an ACK message is transmitted to the call initiator, and the caller information transmission and reception control unit (16 in FIG. 7) transmits to the new callout other terminal the caller information on the terminal that is stored in the caller information storage unit (15 in FIG. 7) (S2 in FIG. 21) and decides whether caller information has been received from the other terminal (S3). It is monitored whether it has not been received for a certain period of time (S4 of FIG. 21), and if the time passes, the other terminal is recognized as a terminal that does not have a caller information display function, and it is set to operate without the display of caller information (S5). If caller information is received, a callout message (conversation in progress) is transmitted to the new callout other party, instructions are given to the caller information transmission and reception control unit (16 in FIG. 7), and the fact that it is in the midst of a new incoming call is displayed on the display unit together with the caller information of the other terminal that has been received, a conversation-in-progress incoming call tone is sent to the terminal speaker, and a message prompting instruction on whether to switch the conversation is displayed on the display unit (S6 of FIG. 21).

Thereupon, it is decided whether the call switching operation has been detected (S7 in FIG. 22); if it is not detected, it is decided whether there has been an operation directing that the conversation be continued (S8); if it is detected, a conversation-impossible message is transmitted to the new callout other party, and the current conversation is continued (S9). In S7 above, if a call switching operation is detected, the call switching unit (22 in FIG. 7) is controlled and the conversation is switched to the new incoming call, the fact that there is a call on hold is displayed on the display unit, an on-hold message is transmitted to the previous other party (S10 in FIG. 22), and a holding tone is transmitted from the holding tone transmission unit (22 in FIG. 7) inside the terminal that receives the on-hold message. Then it is decided whether a hold release operation has been detected (S11 in FIG. 22); if it is detected, the call switching unit transmits a hold release message to the previous other party, switches the call to said other party, displays said other caller information on the display unit (no hold call, conversation in progress) (S12), stops the holding tone from the holding tone transmission unit, and returns to the initial conversation-in-progress state.

FIG. 23 shows the processing flow chart of the terminal that is put on hold due to a new incoming call during a conversation by the processing of FIG. 22; in the conversation-in-progress state, it is decided whether a hold message has been received (S1 of FIG. 23); if it is received, transmission and reception of voice communication information to the communication network is stopped, instructions are given to the holding tone transmission unit to send a holding tone to the speaker, and on-hold is displayed on the display unit (S2). Thereafter, reception of a hold release message is monitored (S3 in FIG. 23), and if it is received, transmission and reception of voice communication information to the communication network is resumed, sending of the holding tone is stopped, the call circuit is switched to the network side, and the fact that a conversation is in progress is displayed on the display unit (S4).

By the processing flow shown in FIGS. 22 and 23 above, when a new incoming call from a third terminal arises during a two-person conversation, the person who made the new incoming call is recognized by transmitting, receiving, and displaying his caller information, and a selection can be made as to whether to switch to the conversation with his terminal. And a terminal on hold due to an incoming call during a conversation can prevent the flow of unneeded voice information packets by stopping the transmission of packets to the communication network. In the above processing flow, an example of a two-person conversation is shown, but by replacing the call switching unit (22 in FIG. 7) with a call mixing unit that allows three-person conference calls, it is also possible to make a change so that a third terminal from which a new incoming call is made can participate in the previously two-person conversation, conversing in conference conversational mode. A call mixing unit has the function of adding the voice information received from the two other parties, as well as the function of transmitting the local terminal's output voice to each of the two other parties.

Figure 24:
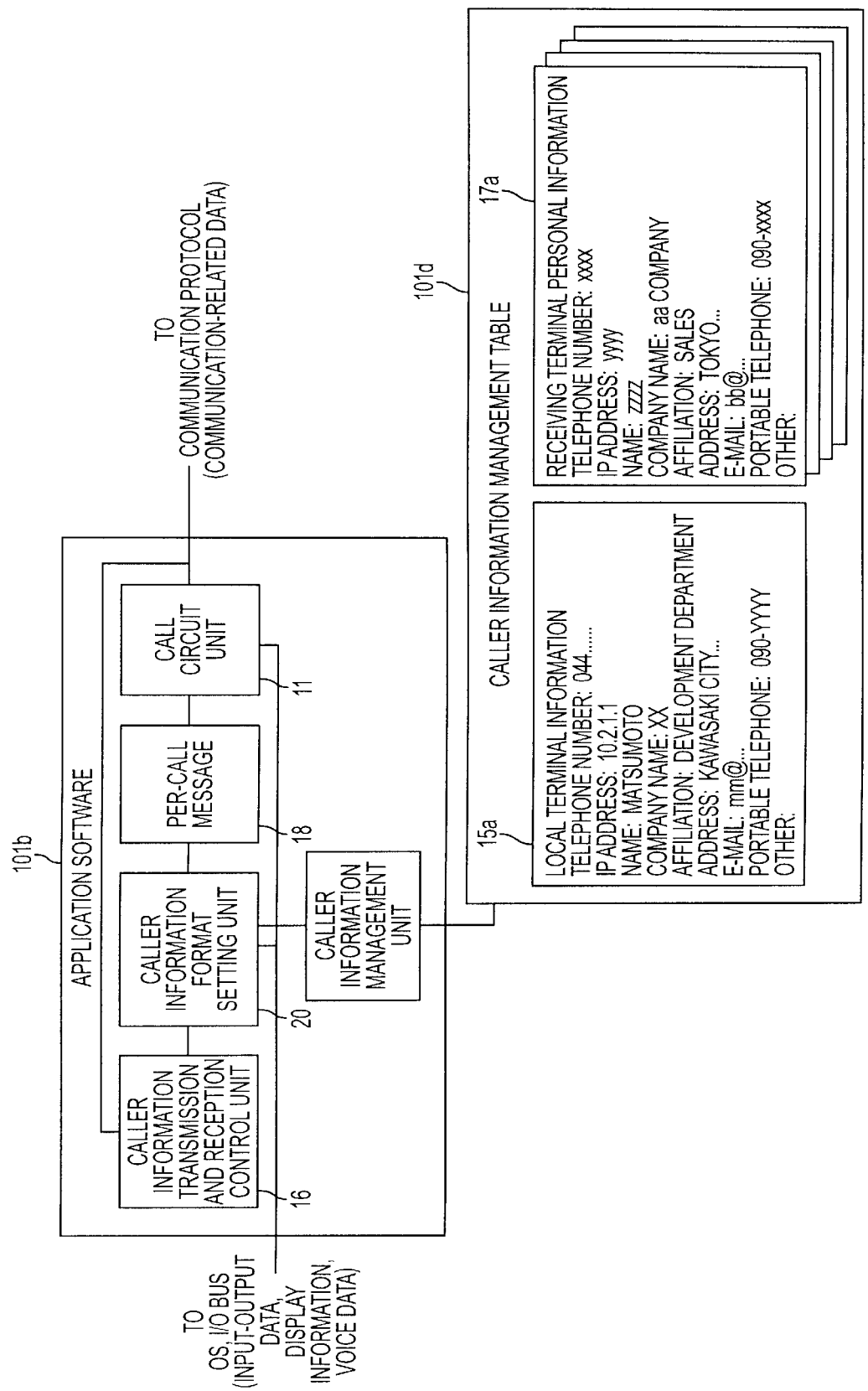
FIG. 24 is a diagram showing an embodiment of the terminal application software and a caller information management table.

FIG. 24 diagrammatically shows an embodiment of terminal application software and a caller information management table. Application software 101b (see FIG. 9) includes a program that performs control of caller information display according to this invention; in the working example of FIG. 24, it consists of caller information transmission and reception control unit 16 (see FIGS. 1–7), caller information format setting unit 20 (see FIG. 5), per-call message [storage unit] 18 (see FIGS. 3–5), call circuit unit 11 (see FIGS. 1–7), and a caller information management unit (the function of part of control unit 10 in FIGS. 1–7), and the caller information management table (101d in FIG. 9) has local terminal information 15a (corresponding to caller information storage unit 15 in FIGS. 1–5 and 7) and reception terminal information 1 7a (corresponding to reception caller information storage unit 17 in FIGS. 2–5). Included as local terminal information 15a in the example shown in the diagram are a telephone number, IP address, person's name, company name, affiliation, address, e-mail, and portable telephone number, and reception terminal information 17a likewise consists of similar information.

FIG. 25A is an example of a display of caller information and FIG. 25B is an example of an input screen for incoming call response messages; it corresponds to the fourth fundamental composition of this invention. FIG. 25A is a display example on the incoming-call side of the caller information; displayed are an image of the caller, and his address (telephone number), name, company name, affiliation, [e-]mail address, portable telephone number, etc. The messages among them are per-call messages (according to the third fundamental composition of this invention) and messages sent from the calling terminal to the called terminal together with the caller information and displayed. FIG. 25B is an example of a screen on which one selects and inputs incoming call response messages; it corresponds to the fourth fundamental composition of this invention (FIG. 4) and is a screen that is displayed in the processing flow of the called terminal shown in FIG. 18 above. On this screen, below the display of "Please select incoming-call processing" are displays reading—Respond,—Transmit (Select) a following message, below which are displayed various messages such as "I'm busy, I'll return your call" or "Please contact me by e-mail"; when the user on the incoming-call side selects a response message from them that corresponds to the situation at the time, a message such as what is shown at the bottom of part A of FIG. 25 is transmitted.

FIG. 26 is an example of a display of a terminal at the time of common telephone directory database operation; it corresponds to the sixth fundamental composition of this invention. FIG. 26B shows the search item input screen of the common telephone directory; the input area including name, company name, and affiliation is displayed. If one inputs the surname "Suzuki" for the name among these items, a search is conducted in the common telephone directory database, and search results such as those shown in part B are displayed. If one selects name "1" in response to the display of the search results, caller information stored in the database is displayed, as shown in part C.

FIG. 27 shows the operation sequence according to this invention, from making a call until conversation-in-progress. In the example shown in this FIG. 27, we describe the operation sequence from making a call until conversation-in-progress when the operator of terminal 1 initiates a telephone call, taking terminal 1 as the calling side and terminal 2 as the called side. To perform a telephone operation, it is necessary to have application software that has telephone communication functions (called a communication application); it is assumed that both terminal 1 and terminal 2 have a previously started communication application. Also, time information is being transmitted and received between the terminals and it is detected whether it is the latest caller information, which corresponds to the second fundamental composition of this invention.

In order to initiate a telephone call, the operator of terminal 1 inputs a per-call message and the telephone number of terminal 2 on the call-making screen of the communication application (S10 in FIG. 27) and carries out the calling operation (S11). In order to obtain the IP address information from the other two telephone numbers, terminal 1 goes to make an inquiry to the gatekeeper (not shown in FIG. 27), and obtains the IP address information of terminal 2. After obtaining the IP address information, the communication application of terminal 1 transmits a callout message (IP packet) to terminal 2 (a of FIG. 27). The communication application of terminal 2, which receives the callout message, returns an ACK signal (b in FIG. 27) and transmits to terminal 1 the time information of the caller information of terminal 2(c). The communication application of terminal 1, which receives the ACK signal, recognizes that the other terminal is able to communicate, and transmits to terminal 2 the time information and per-call message of the caller information of terminal 1 (d in FIG. 27). Terminals 1 and 2, which receive the time information of the caller information, confirm whether the caller information of the other terminal exists within the local terminal, and if it does not, transmit to the other terminal an ACK message requesting transmission of the caller information (e in FIG. 27), and if caller information exists inside the local terminal, the received time information and the time information of the caller information held inside the local terminal are compared (S12 and S21 of FIG. 27). If, as a result of the comparison, the received time information is newer, an ACK message requesting the transmission of caller information is transmitted to the other terminal, and if the received time information is the same, an ACK message indicating that there is no need to transmit caller information is transmitted to the other terminal. Terminals 1 and 2, which receive ACK messages, transmit their own caller information in accordance with the content of the messages.

In the example of FIG. 27, terminal 1 does not transmit its own caller information to terminal 2, and only terminal 2 transmits its own caller information to terminal 1 (g of FIG. 27). Terminal 2, which confirms that the caller information of terminal 1 that is held in its own terminal is the latest, performs an incoming-call display on the display, together with the caller information of terminal 1 (S23 in FIG. 27), and transmits a callout-in-progress message to terminal 1 (h in FIG. 27).

Terminal 1, which receives the caller information of terminal 2 and a callout-in-progress message, performs a callout-in-progress display on the display, together with the caller information of terminal 2 (S16 in FIG. 27). When the communication application of terminal 2 detects a response operation by an operation of the input unit (S26 in FIG. 27), it transmits a response message to terminal 1 (i in FIG. 27) and displays conversation-in-progress on the display (S27 of FIG. 27). At the same time, it starts the call circuit of the voice control card, makes the input and output of the handset effective, converts the input voice information from the handset to a digital signal with a codec (coder-decoder), then puts the data on a voice IP packet addressed to the address of terminal 1, transmits it to the LAN card via the I/O bus, begins transmission to terminal 1, extracts the voice data from the voice IP packet received from terminal 1, converts it to an analog signal by codec, then transmits it to the handset. By this operation, voice communication is begun. Terminal 1, which receives a response message from terminal 2, displays conversation-in-progress on the display, and becomes a conversation-in-progress local terminal by a procedure similar to terminal 2.

Next, FIG. 28 shows the operation sequence between terminals from making a call until abandonment midway due to transmission and reception (by the fourth fundamental composition of this invention) of response messages. In this example of FIG. 28 too, as with FIG. 27 above, terminal 1 is on the calling side, terminal 2 is on the called side, and until the sequence of a–h, it is the same as FIG. 27 above. Hereafter, if a transmission operation of an incoming call response message (for example, a message saying "I'm busy, I'll call back") such as is shown in part B of FIG. 25 above is done in terminal 2 (S26 and i in FIG. 28), the incoming call response message is displayed on terminal 1 (S17). If, seeing this message, the caller of terminal 1 on the calling side abandons the conversation midway (S18), a cutoff message is transmitted to terminal 2 (j), and terminal 2, which receives it, stops incoming calls (S27) and transmits a cutoff message to terminal 1 (k).

FIG. 29 shows the operation sequence in the case in which an incoming call from a third terminal occurs during a two-person conversation; it corresponds to the seventh fundamental composition of this invention. In this example, a callout from terminal 3 to terminal 2 occurs during conversation between terminal 1 and terminal 2, a caller information transmission and reception sequence is executed as shown in the diagram, a switching operation to the conversation between terminal 2 and terminal 3 is carried out, and terminal 1 is put on hold. Then, through conversation between terminal 3 and terminal 2, a cutoff operation is performed from terminal 2 to terminal 3, and a sequence is executed in which the hold on terminal 1 is released.

FIG. 30 shows the operation sequence for updating the database in which caller information is stored; it corresponds to the above sixth fundamental composition of this invention.

This is the case in which the caller information of terminal 1 that is stored in terminal 2 is updated when caller information is transmitted from terminal 1 to terminal 2. When terminal 2 by this updating attaches a database address, makes a call, and inquires about the time information (update time) concerning the caller information of terminal 1, an information search is done in the database, and if it is found that the inquired-after time information is newer than the registered time information, it asks terminal 2 for the updated caller information. When the caller information is transmitted in response thereto, the information corresponding to the database is updated.

FIG. 31 shows the operation sequence between a communication terminal and the database at the time of a caller information inquiry. Like FIG. 30 above, this sequence too corresponds to the sixth fundamental composition of this invention, but it is the sequence for the case in which the database is used as a telephone directory.

When the search screen is displayed on terminal 1 and condition input is done, the conditions are transmitted to the database, a conditional search is done on the database, and when the results are transmitted to terminal 1, they are displayed on terminal 1. When additional narrowing conditions are input in response to the display, condition 1 and corresponding added condition 2 are both transmitted to the database. When a search is made by the conditions received by the database, the results are transmitted to terminal 1, and the results are displayed on terminal 1. When, in response to this display, an item is selected on terminal 1 and caller information is requested concerning that item, an information search is conducted in the database concerning the requested item, and the caller information that is obtained is transmitted to terminal 1. When this information is received, it is displayed on terminal 1.

Effects of the Invention

With the first fundamental composition of this invention, in the communication setup procedure, not only is caller information on the call initiator transferred to the call recipient, but caller information on the call recipient is also transferred to the call initiator, so the latest caller information on the other party can be displayed on each terminal, the call initiator's as well as the call recipient's, at the time of call arrival, callout, and display, thus making it possible to easily identify the other party when a call is made or received, and improving the serviceability of the communication. And by storing in the local terminal the caller information that is displayed on the other party's terminal, updating of information from one's own terminal input unit is made easy, and the operability at the time of operation is improved.

With the second fundamental composition of this invention, the amount of communication between calling and called terminals when communication is set up can be reduced and the communication time needed for passing information can be shortened, thereby speeding up the display of information and further improving serviceability.

With the third fundamental composition of this invention, by displaying on the called terminal the per-call message that is input by the call initiator, in receiving a call it is possible to learn of the nature and degree of urgency of the conversation before answering, which further improves serviceability.

With the fourth fundamental composition of this invention, by the call recipient transmitting an incoming call response message to the call initiator when a call comes in, the call recipient can handle the conversation without responding to the callout, which can improve serviceability.

With the fifth fundamental composition of this invention, caller information is transmitted in correspondence with the items of the format, so the amount of information that is transmitted can be reduced, the communication time is shortened, and the display of information can be speeded up, which further improves serviceability.

With the sixth fundamental composition of this invention, caller information of each terminal can be shared on the database server, thus making it possible to use applications of a common telephone directory in each terminal, which improves serviceability. Also, because the information is updated automatically, when one uses a shared database, it is useful as an information updating means.

With the seventh fundamental composition of this invention, caller information on a new call initiator can be displayed even during a conversation, thus making various services possible, such as interrupting a conversation on an urgent matter or giving notification of the nature of the matter, thus further improving serviceability. Moreover, because a terminal on hold generates the holding tone on its own and does not transmit voice packets to the network, there is the effect of suppressing unnecessary traffic.

What is claimed is:

1. A caller information display system of a terminal in a communication system that allows voice communication and data communication between multiple terminals via a network by Internet protocol, comprising:

a caller information storage unit in which caller information of each local terminal is stored in advance in each terminal, an input unit that inputs caller information; a display unit that displays caller information, a call circuit unit that controls voice communication, and a caller information transmission and reception control unit that controls transmission and reception of caller information when a call is made or received, wherein when a calling terminal makes a call with a called terminal, caller information is mutually transferred between the calling terminal and the called terminal, and the caller information of the calling terminal is displayed on a display unit of the called terminal, and the caller information of the called terminal is displayed on a display unit of the calling terminal with a callout or incoming call display.

2. The caller information display system of claim 1, further comprising, within the terminal a per-call message storage unit that stores messages one wants to be displayed on said another terminal when a call is made to another terminal, wherein a content of said per-call message storage unit is displayed on the display unit of said another terminal, together with said caller information, when said another terminal is called by making a call to ad another terminal.

3. The caller information display system of claim 1, and further comprising within the terminal, an incoming call response message storage unit that stores messages to be transmitted to another terminal when a call arrives from said another terminal wherein when a call arrives from another terminal, the content of said incoming call response message storage unit is displayed and an incoming call response message is transmitted to a calling side in accordance with a response instruction input with respect to the display content.

4. The caller information display system of claim 1 comprising, within the terminal, a caller information format setting unit that sets a format of the caller information, wherein when caller information is transmitted to another caller, only content information of said format is transmitted and a display of caller information based on said set format is displayed.

5. The caller information display system of claim 4, further comprising a database server that can share caller information with multiple terminals on said network and within the terminal, a server address storage wit that manages the address information of said database server, wherein when caller information is updated each terminal transfers the updated caller information to said database server and updates the content of said database server, and each terminal references said database server for needed caller information.

6. The caller information display system of claim 1, and further comprising, within the terminal, a call switching unit that switches another caller, and a holding tone transmission unit that sends a holding tone to the handset, wherein when a call arrives from a third terminal at one terminal during a call, caller information of said third terminal as well as a message inquiring whether to do call switching are displayed on the display unit of said one terminal, and according to the call switching instruction input, said call switching unit is operated and said another caller is switched, and a holding tone is transmitted from said holding tone transmission unit to the terminal of a person who until then has been said another caller.

7. The caller information display system of a terminal in a communication system that allows voice communication and data communication between multiple terminals via a network by Internet protocol, the caller information display system comprising:

a caller information storage unit in which caller information of each local terminal is stored in advance in each terminal;

an input unit that inputs caller information;

a display unit that displays caller information;

a call circuit unit that controls voice communication; and a caller information transmission and reception control unit that controls transmission and reception of caller information when a call is made or received, wherein when a call is made or received by voice communication with another terminal of said multiple terminals, caller information is mutually transferred between a calling terminal and a called terminal, and information of another caller is displayed on a respective display unit of both the caller terminal and a call recipient terminal simultaneously with a callout or incoming call display, the caller information display system further comprising, within the terminal a reception caller information storage unit in which is stored the caller information received from another caller, a time management unit that manages an update time of the received caller information and caller information of the local terminal, and a time exchange unit that before the transmission or reception of caller information performs transmission and reception of the tune of the caller information held in the local terminal, wherein caller information on another caller is held in the local terminal, the caller information from another terminal is obtained and displayed only if the time when received from another terminal is newer than the time held in the local terminal.

8. A caller information display system of a terminal in a communication system that allows communication between terminals via a network by Internet protocol comprising:

a caller information storage unit in which caller information is stored in advance in each terminal;

a display unit that displays caller information; and a caller information transmission and reception control unit that controls transmission and reception of caller information when a call is made or received, wherein when a calling terminal makes a call with a called terminal each caller information is mutually transferred between the calling terminal and the called terminal, and the caller information of the calling terminal is displayed on a display unit of the called terminal, and the caller information of the called terminal is displayed on a display unit of the calling terminal.

* * * * *